US012750758B2

(12) United States Patent
Zheng

(10) Patent No.: US 12,750,758 B2
(45) Date of Patent: Sep. 29, 2026

(54) COMMUNICATION PATH CONFIGURATION METHOD AND APPARATUS, AND TERMINAL

(71) Applicant: VIVO MOBILE COMMUNICATION CO., LTD., Guangdong (CN)

(72) Inventor: Qian Zheng, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 295 days.

(21) Appl. No.: 18/673,921

(22) Filed: May 24, 2024

(65) Prior Publication Data

US 2024/0314669 A1 Sep. 19, 2024

Related U.S. Application Data

(63) Continuation of application No. PCT/CN2022/135466, filed on Nov. 30, 2022.

(30) Foreign Application Priority Data

Dec. 1, 2021 (CN) ......................... 202111459077.1

(51) Int. Cl.
*H04W 40/02* (2009.01)
*H04W 76/10* (2018.01)
(Continued)

(52) U.S. Cl.
CPC ........... *H04W 40/02* (2013.01); *H04W 76/10* (2018.02); *H04W 76/27* (2018.02); *H04W 88/04* (2013.01)

(58) Field of Classification Search
CPC ..... H04W 24/10; H04W 76/14; H04W 76/10; H04W 40/12; H04W 76/27; H04W 40/24;
(Continued)

(56) References Cited

U.S. PATENT DOCUMENTS

2019/0141771 A1 5/2019 Ma et al.
2020/0029384 A1 1/2020 Hong et al.
(Continued)

FOREIGN PATENT DOCUMENTS

EP 3471493 A1 4/2019
JP WO2017130593 A1 11/2018
(Continued)

OTHER PUBLICATIONS

First Office Action dated Apr. 23, 2025 received in corresponding patent family application No. CN202111459077.1. English translation attached.
(Continued)

*Primary Examiner* — Syed Ali

(57) ABSTRACT

This application discloses a communication path configuration method and apparatus, and a terminal. The communication path configuration method in embodiments of this application includes: performing, by remote UE, a first operation or a second operation for at least one of a direct path and an indirect path; and communicating, by the remote UE, with a network side through the direct path and the indirect path, where the first operation includes an establishment operation, a reestablishment operation, or a first recovery operation, the second operation includes a second recovery operation, and the second recovery operation includes an operation of recovering, by the remote UE, the indirect path through the direct path, or an operation of recovering, by the remote UE, the direct path through the indirect path.

11 Claims, 6 Drawing Sheets

(51) Int. Cl.
*H04W 76/27* (2018.01)
*H04W 88/04* (2009.01)

(58) Field of Classification Search
CPC ..... H04W 76/18; H04W 40/02; H04W 40/22; H04W 24/08; H04W 76/23; H04W 76/15; H04W 76/19; H04W 88/04; H04W 92/18
See application file for complete search history.

(56) References Cited

U.S. PATENT DOCUMENTS

| | | | | |
|---|---|---|---|---|
| 2022/0377823 | A1* | 11/2022 | Elazzouni | H04W 76/15 |
| 2023/0148166 | A1* | 5/2023 | Kuo | H04W 40/22<br>370/328 |
| 2023/0171825 | A1* | 6/2023 | Kuo | H04W 76/19<br>370/315 |
| 2024/0064838 | A1* | 2/2024 | Orsino | H04W 76/18 |
| 2024/0205789 | A1* | 6/2024 | Wu | H04W 8/22 |
| 2024/0214288 | A1* | 6/2024 | Wang | H04L 43/0811 |
| 2024/0214848 | A1* | 6/2024 | Kang | H04W 24/10 |
| 2024/0284272 | A1* | 8/2024 | Teyeb | H04W 36/0061 |

FOREIGN PATENT DOCUMENTS

| | | | |
|---|---|---|---|
| WO | 2018006253 | A1 | 1/2018 |
| WO | 2021037582 | A1 | 3/2021 |
| WO | 2021134725 | A1 | 7/2021 |
| WO | 2021172964 | A1 | 9/2021 |
| WO | 2021207505 | A1 | 10/2021 |

OTHER PUBLICATIONS

Extended European Search Report dated Jan. 14, 2025 received in corresponding European Application No. EP22900530.1.

Notice of Reasons for Refusal dated May 7, 2025 received in corresponding patent family application No. JP2024532439. English translation attached.

International Search Report dated Feb. 24, 2023 in International Application No. PCT/CN2022/135466. English translation attached.

Written Opinion of the ISA dated Feb. 24, 2023 in International Application No. PCT/CN2022/135466. English translation attached.

* cited by examiner

COMMUNICATION PATH CONFIGURATION METHOD AND APPARATUS, AND TERMINAL

CROSS-REFERENCE TO RELATED APPLICATIONS

This application is a Bypass Continuation Application of PCT International Application No. PCT/CN2022/135466 filed on Nov. 30, 2022, which claims priority to Chinese Patent Application No. 202111459077.1, filed in China on Dec. 1, 2021, which are incorporated herein by reference in their entireties.

TECHNICAL FIELD

This application pertains to the field of wireless communications technologies, and specifically, to a communication path configuration method and apparatus, and a terminal.

BACKGROUND

In a sidelink (SL, which may also be referred to as a secondary link or a side link) relay scenario in a wireless communications system, a remote terminal (Remote UE) usually supports only single-path transmission. For example, all transmission by the remote UE is implemented through either an indirect path or a direct path.

SUMMARY

According to a first aspect, a communication path configuration method is provided, and includes: performing, by remote UE, a first operation or a second operation for at least one of a direct path and an indirect path; and communicating, by the remote UE, with a network side through the direct path and the indirect path, where the first operation includes an establishment operation, a reestablishment operation, or a first recovery operation, the second operation includes a second recovery operation, and the second recovery operation includes an operation of recovering, by the remote UE, the indirect path through the direct path, or an operation of recovering, by the remote UE, the direct path through the indirect path.

According to a second aspect, a communication path configuration apparatus is provided, and includes: an operation module, configured to perform a first operation or a second operation for at least one of a direct path and an indirect path, where remote UE communicates with a network side through the direct path and the indirect path, the first operation includes an establishment operation, a reestablishment operation, or a first recovery operation, the second operation includes a second recovery operation, and the second recovery operation includes an operation of recovering, by the remote UE, the indirect path through the direct path, or an operation of recovering, by the remote UE, the direct path through the indirect path.

According to a third aspect, a terminal is provided, where the terminal includes a processor, a memory, and a program or instructions stored in the memory and capable of running on the processor, and when the program or instructions are executed by the processor, the steps of the method according to the first aspect are implemented.

According to a fourth aspect, a terminal is provided, including a processor and a communications interface, where the communications interface is coupled to the processor, and the processor is configured to run a program or instructions to implement the steps of the method according to the first aspect.

According to a fifth aspect, a readable storage medium is provided, where the readable storage medium stores a program or instructions, and when the program or instructions are executed by a processor, the steps of the method according to the first aspect are implemented.

According to a sixth aspect, a chip is provided, where the chip includes a processor and a communications interface, the communications interface is coupled to the processor, and the processor is configured to run a program or instructions to implement the steps of the method according to the first aspect.

According to a seventh aspect, a computer program or program product is provided, where the computer program or program product is stored in a non-transitory storage medium, and the program or program product is executed by at least one processor to implement the steps of the method according to the first aspect.

DESCRIPTION OF EMBODIMENTS

The following clearly describes technical solutions in embodiments of this application with reference to accompanying drawings in embodiments of this application. Clearly, the described embodiments are some but not all of embodiments of this application. All other embodiments obtained by a person of ordinary skill in the art based on embodiments of this application shall fall within the protection scope of this application.

The terms "first", "second", and the like in this specification and the claims of this application are used to distinguish between similar objects rather than to describe a specific order or sequence. It should be understood that terms used in this way are interchangeable in appropriate circumstances, so that embodiments of this application can be implemented in an order other than the order illustrated or described herein. In addition, the objects distinguished by "first" and "second" usually belong to one category, and the number of objects is not limited. For example, there may be one or more first objects. In addition, in this specification and the claims, "and/or" represents at least one of connected objects, and the character "/" typically represents an "or" relationship between the associated objects.

It should be noted that technologies described in embodiments of this application are not limited to a long term evolution (LTE)/LTE-advanced (LTE-A) system, and may be further used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in embodiments of this application are usually used interchangeably, and the technologies described herein may be used in the aforementioned systems and radio technologies, and may also be used in other systems and radio technologies. In the following descriptions, a new radio (NR) system is described for an illustration purpose, and NR terms are used in most of the following descriptions, but these technologies may also be applied to applications other than an NR system application, for example, a 6th generation (6G) communications system.

Figure 1A:
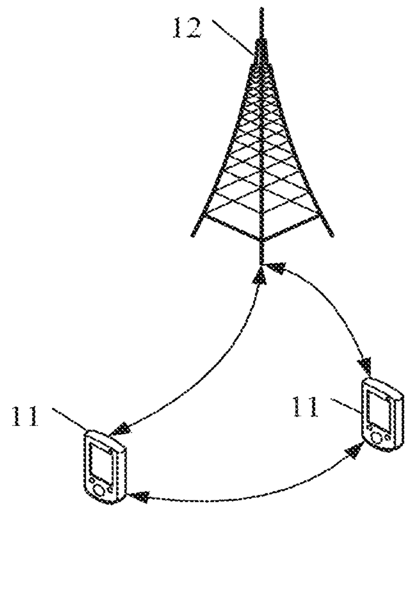
FIG. 1*a* is a schematic structural diagram of a wireless communications system according to an exemplary embodiment of this application.

FIG. 1*a* is a schematic structural diagram of a wireless communications system to which embodiments of this application are applicable. A wireless communications system includes a terminal 11 and a network-side device 12 (which may also be referred to as a network side). The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a smartwatch, a wrist band, a headset, glasses, or the like. It should be noted that a specific type of the terminal 11 is not limited in embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in embodiments of this application, but a specific type of the base station is not limited.

Based on the descriptions of the wireless communications system, as shown in FIG. 1*b*, FIG. 1*c*, FIG. 1*d*, and FIG. 1*e*, this application further provides a schematic diagram of an SL relay communication scenario.

Figure 1B:
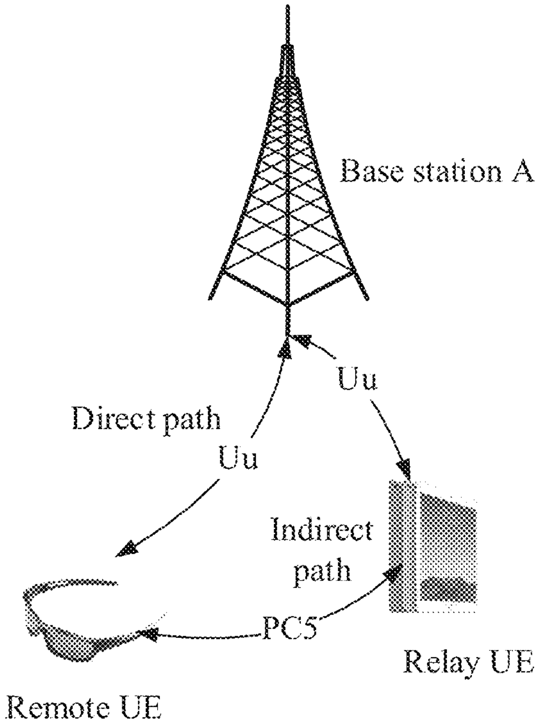
FIG. 1*b* is a first schematic diagram of an SL relay communication scenario according to an exemplary embodiment of this application.

An SL relay communication scenario shown in FIG. 1*b* includes at least remote UE, relay UE, and a base station A. A direct path and an indirect path are established between the remote UE and the base station A. To be specific, in the SL relay communication scenario shown in FIG. 1*b*, the remote UE can support transmission on both the direct path and the indirect path, and the direct path and the indirect path may be controlled by the same base station A.

Figure 1C:
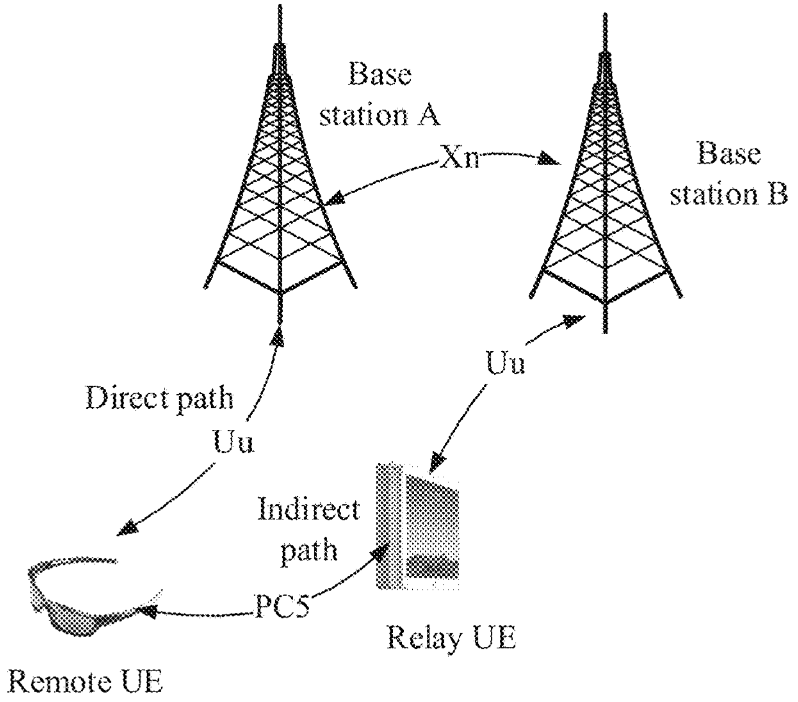
FIG. 1*c* is a second schematic diagram of an SL relay communication scenario according to an exemplary embodiment of this application.

An SL relay communication scenario shown in FIG. 1*c* includes at least remote UE, relay UE, a base station A, and a base station B. A direct path is established between the remote UE and the base station A. An indirect path is established between the remote UE and the base station B. To be specific, in the SL relay communication scenario shown in FIG. 1*c*, the remote UE can support transmission on both the direct path and the indirect path, but the direct path and the indirect path are controlled by different base stations A and B. It should be noted that the base station A and the base station B may communicate with each other through an Xn interface.

Figure 1D:
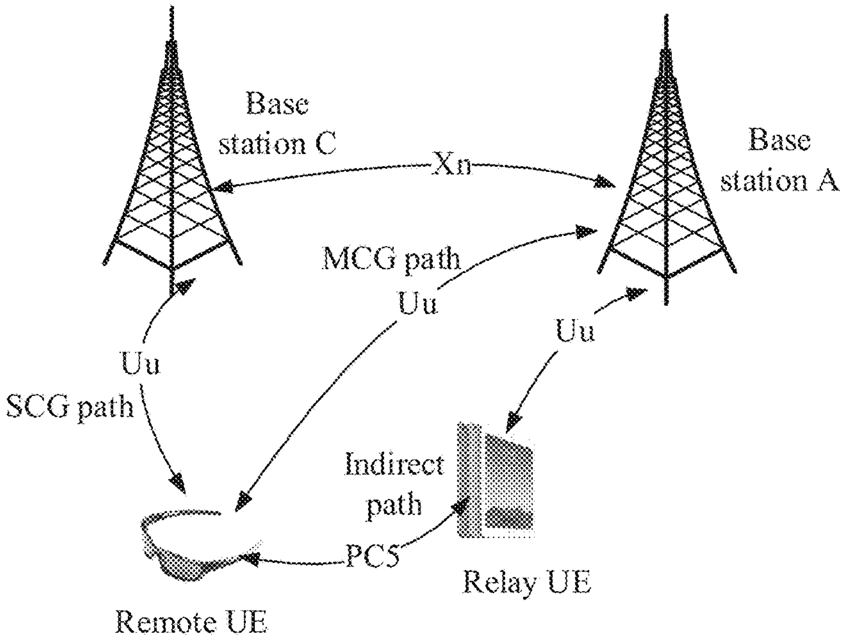
FIG. 1*d* is a third schematic diagram of an SL relay communication scenario according to an exemplary embodiment of this application.

Different from FIG. 1*b*, in an SL relay communication scenario shown in FIG. 1*d*, a direct path of remote UE includes a master cell group (MCG) path and a secondary cell group (SCG) path. To be specific, the direct path of the remote UE shown in FIG. 1*d* is in dual connectivity.

Figure 1E:
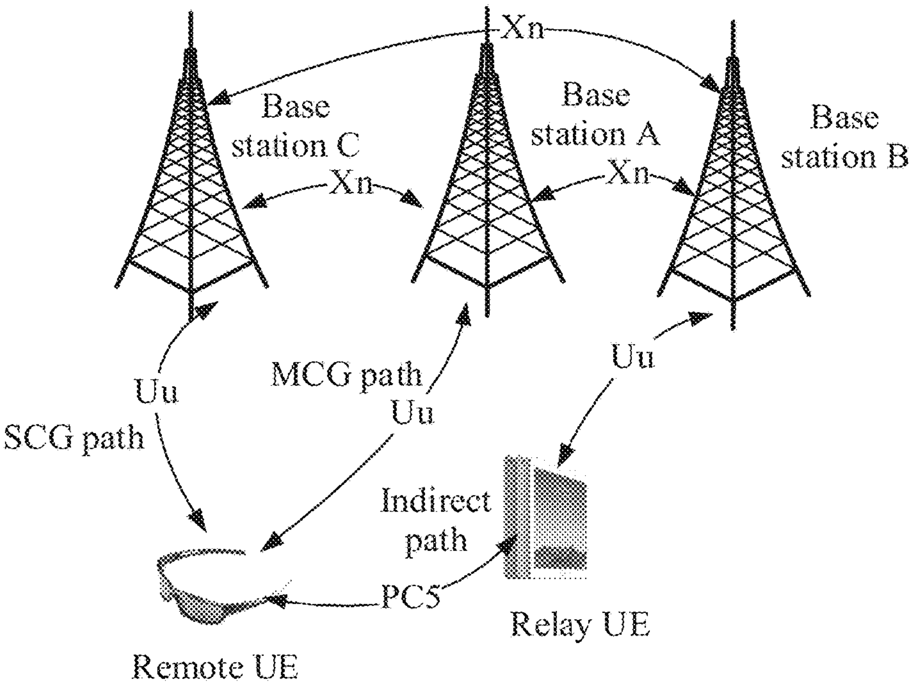
FIG. 1*e* is a fourth schematic diagram of an SL relay communication scenario according to an exemplary embodiment of this application.

Different from FIG. 1*c*, in an SL relay communication scenario shown in FIG. 1*e*, a direct path of remote UE includes an MCG path and an SCG path. To be specific, the direct path of the remote UE shown in FIG. 1*e* is in dual connectivity.

In addition, it can be understood that the "indirect path" mentioned in the context of this application is a radio link through which the remote UE establishes an RRC connection to the base station through the relay UE and an air interface of the relay UE, and the "direct path" is a radio link through which the remote UE establishes an RRC connection to the base station through a Uu interface of the remote UE.

Based on the descriptions of the wireless communications system and the SL relay communication scenario, the following further describes in detail technical solutions provided in embodiments of this application with reference to accompanying drawings and by using some embodiments and application scenarios thereof.

Figure 2:
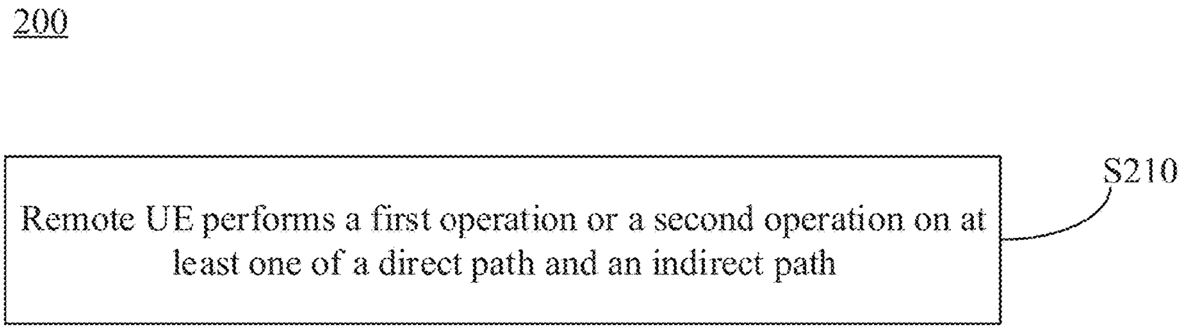
FIG. 2 is a first schematic flowchart of a communication path configuration method according to an exemplary embodiment of this application.

FIG. 2 is a schematic flowchart of a communication path configuration method 200 according to an exemplary embodiment of this application. The method 200 may be performed by remote UE but is not limited thereto, and may be specifically performed by hardware and/or software installed in the remote UE. In this embodiment, the method 200 may include at least the following steps.

S210: The remote UE performs a first operation or a second operation for at least one of a direct path and an indirect path.

The first operation includes an establishment operation, a reestablishment operation, or a first recovery operation. To be specific, when the remote UE needs to establish both a direct path and an indirect path, or when at least one of a direct path and/or an indirect path supported by the remote UE fails or encounters another problem and needs to be recovered or reestablished, the remote UE may establish, reestablish, or recover the direct path and/or the indirect path by triggering an RRC process to perform the establishment operation, the reestablishment operation, or the first recovery operation. In this way, the remote UE can implement path reestablishment and recovery in multi-path transmission while supporting the multi-path transmission. In addition, because the remote UE supports the multi-path transmission, even if one of a plurality of paths supported by the remote UE fails, transmission can still be performed through another path without a failure, to ensure RRC robustness of the remote UE.

The second operation includes a second recovery operation. The second recovery operation includes an operation of recovering, by the remote UE, the indirect path through the direct path, or an operation of recovering, by the remote UE, the direct path through the indirect path. To be specific, when the remote UE supports both the direct path and the indirect path, if the direct path or the indirect path fails, the remote UE can quickly recover a failed path through a path without a failure. This can effectively shorten radio link recovery time, avoid a problem in the conventional technology that radio link recovery time is long because an RRC reestablishment process needs to be initiated, and improve RRC robustness of the remote UE.

In addition, the remote UE communicates with a network side through the direct path and the indirect path. To be specific, the first operation or the second operation is performed, so that the remote UE can communicate with the network side through both the direct path and the indirect path. As shown in FIG. 1*b* and FIG. 1*c*, the network side may include one base station for controlling both the indirect path and the direct path, or two base stations for separately controlling the indirect path and the direct path. This is not limited in this embodiment.

In this embodiment, the remote UE performs the first operation or the second operation for at least one of the direct path and the indirect path that are supported. In this way, on the one hand, the direct path and/or the indirect path are established, reestablished, or recovered through the establishment operation, the reestablishment operation, or the first recovery operation, so that the remote UE can communicate with a network-side device through a plurality of paths, and can implement path reestablishment and recovery in multi-path (including the direct path and the indirect path) transmission while supporting the multi-path transmission, to ensure RRC robustness of the remote UE; on the other hand, a failed path is quickly recovered through a path without a failure, to effectively shorten radio link recovery time, avoid a problem in the conventional technology that radio link recovery time is long because an RRC reestablishment process needs to be initiated, and improve RRC robustness of the remote UE.

Figure 3:
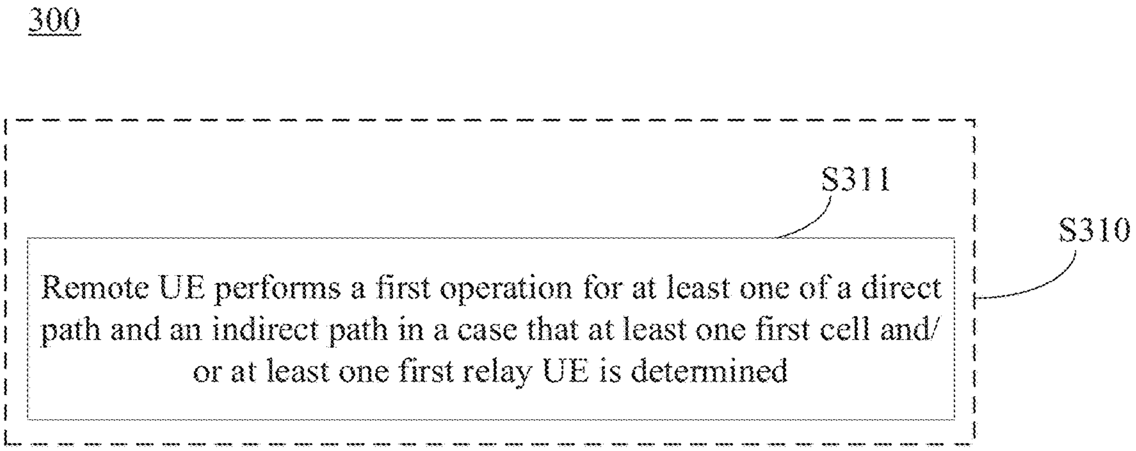
FIG. 3 is a second schematic flowchart of a communication path configuration method according to an exemplary embodiment of this application.

FIG. 3 is a schematic flowchart of a communication path configuration method 300 according to an exemplary embodiment of this application. The method 300 may be performed by remote UE but is not limited thereto, and may be specifically performed by hardware and/or software installed in the remote UE. In this embodiment, the method 300 may include at least the following steps.

S310: The remote UE performs a first operation or a second operation for at least one of a direct path and an indirect path.

The remote UE communicates with a network side through the direct path and the indirect path.

The first operation includes an establishment operation, a reestablishment operation, or a first recovery operation. The second operation includes a second recovery operation. The second recovery operation includes an operation of recovering, by the remote UE, the indirect path through the direct path, or an operation of recovering, by the remote UE, the direct path through the indirect path.

It can be understood that, for an implementation process of S310, reference may be made to related descriptions in the method embodiment 200. In addition, in a possible implementation, still as shown in FIG. 3, a process of performing, by the remote UE, the first operation for at least one of the direct path and the indirect path may be implemented in S311. Content is as follows:

S311: The remote UE performs the first operation for at least one of the direct path and the indirect path in a case that at least one first cell and/or at least one first relay UE is determined.

The remote UE communicates with the network side through the direct path and the indirect path.

The at least one first cell is a cell that is obtained by the remote UE by performing a cell selection or reselection process and that meets a cell selection or reselection condition, that is, a suitable cell. Correspondingly, the at least one first relay UE is relay UE that is obtained by the remote UE by performing a relay selection or reselection process and that meets a relay selection or reselection condition, that is, suitable relay UE.

Based on this, a process of performing, by the remote UE, the establishment operation for at least one of the direct path and the indirect path based on the at least one first cell and/or the at least one first relay UE may include the following (11) and/or (12). Content is as follows:

(11) The remote UE establishes the direct path based on an RRC connection establishment process initiated by a target cell. The target cell is one of the at least one first cell.

For example, the remote UE may first select the target cell from the at least one first cell, and then initiate the RRC connection establishment process based on the target cell to establish the direct path to a first target base station to which the target cell belongs.

It can be understood that a manner of selecting, by the remote UE, the target cell from the at least one first cell may be random selection, selection based on performance of the first cell, or the like. This is not limited herein.

(12) The remote UE establishes the indirect path based on an RRC connection establishment process initiated by target relay UE. The target relay UE is one of the at least one first relay UE.

For example, the remote UE may first select the target relay UE from the at least one first relay UE, and then initiate the RRC connection establishment process based on the relay UE to establish the indirect path to a second target base station to which the target relay UE belongs.

Similar to the selection of the target cell, a manner of selecting, by the remote UE, the target relay UE from the at least one first relay UE may be random selection, selection based on performance of the first relay UE, or the like. This is not limited herein.

In addition, the first target base station mentioned in (11) may be the same as or different from the second target base station mentioned in (12). To be specific, the direct path and the indirect path may be controlled by one base station, or may be separately controlled by different base stations, for example, as shown in FIG. 1*b* and FIG. 1*c*.

Further, a process of performing, by the remote UE, the reestablishment operation for at least one of the direct path and the indirect path based on the at least one first cell and/or the at least one first relay UE may include the following (13) and/or (14). Content is as follows:

(13) The remote UE reestablishes the direct path based on an RRC connection reestablishment process initiated by a target cell. The target cell is one of the at least one first cell.

For example, the remote UE may first select the target cell from the at least one first cell, and then initiate the RRC connection reestablishment process based on the target cell to reestablish the direct path to a first target base station to which the target cell belongs.

(14) The remote UE reestablishes the indirect path based on an RRC connection reestablishment process initiated by target relay UE. The target relay UE is one of the at least one first relay UE.

For example, the remote UE may first select the target relay UE from the at least one first relay UE, and then initiate the RRC connection reestablishment process based on the relay UE to reestablish the indirect path to a second target base station to which the target relay UE belongs.

Further, a process of performing, by the remote UE, the first recovery operation for at least one of the direct path and the indirect path based on the at least one first cell and/or the at least one first relay UE may include the following (15) and/or (16). Content is as follows:

(15) The remote UE recovers the direct path based on an RRC connection recovery process initiated by a target cell. The target cell is one of the at least one first cell.

For example, the remote UE may first select the target cell from the at least one first cell, and then initiate the RRC connection recovery process based on the target cell to establish the direct path to a first target base station to which the target cell belongs, to recover the direct path.

(16) The remote UE recovers the indirect path based on an RRC process initiated by target relay UE. The target relay UE is one of the at least one first relay UE.

For example, the remote UE may first select the target relay UE from the at least one first relay UE, and then initiate the RRC connection recovery process based on the relay UE to reestablish the indirect path to a second target base station to which the target relay UE belongs, to recover the indirect path.

It should be noted that, for related descriptions of the selection of the target cell, the selection of the target relay UE, the first target base station, and the second target base station in (13) to (16), reference may be made to related descriptions in (11) and (12). To avoid repetition, details are not described herein again.

In addition, in (11) to (16), in a scenario in which the first operation needs to be performed on both the direct path and the indirect path, an operation order for the direct path and the indirect path is not limited in this embodiment. For example, the remote UE may first establish/recover the direct path, and then establish/recover the indirect path; or may first establish/recover the indirect path, and then establish/recover the direct path.

Certainly, in addition to the foregoing operation modes (for example, establishment, reestablishment, and recovery) for the direct path and the indirect path, if the terminal has established a direct path (for example, the direct path supported by the remote UE does not fail, or the remote UE has established, reestablished, or recovered the direct path according to (11), (13), and (15)), the remote UE may directly establish, reestablish, or recover the indirect path based on the direct path. This improves configuration efficiency for the indirect path, shortens configuration time for the indirect path, and improves RRC robustness of the remote UE.

For example, assuming that the UE has established, reestablished, or recovered the direct path according to (11), (13) and (15), to be specific, in a case that the remote UE performs the first operation for the direct path based on the target cell, the remote UE may further perform (21) to (23) to implement the first operation, for example, establishment, reestablishment or recovery, on the indirect path.

(21) The remote UE may receive a first RRC reconfiguration message or a first RRC recovery message transmitted by the first target base station.

The first target base station is a base station to which the target cell belongs.

The first RRC reconfiguration message includes at least configuration information of second relay UE for establishing or reestablishing the indirect path. The first RRC recovery message includes at least configuration information of the second relay UE for recovering the indirect path.

In an implementation, the second relay UE may be selected by the first target base station from relay UEs cached by the first target base station, or may be selected based on at least one third relay UE reported by the remote UE, or may be selected comprehensively based on the UEs cached by the first target base station and the at least one third relay UE reported by the remote UE. This is not limited in this embodiment.

To be specific, before receiving the first RRC reconfiguration message or the first RRC recovery message transmitted by the first target base station, the remote UE may report related information of the at least one third relay UE to the first target base station for the first target base station to select the second relay UE.

Optionally, the at least one third relay UE includes at least one of the following (211) and (212):

(211) at least some the at least one first relay UE; and (212) at least one fourth relay UE that is determined by the remote UE based on a measurement configuration of the first target base station and that meets a first measurement reporting event. The first measurement reporting event may be implemented through agreement in a protocol, higher-layer configuration, or network-side configuration. This is not limited herein.

In addition, the related information of the at least one third relay UE may include at least one of the following (213) and (214):

(213) identification information of the at least one third relay UE; and (214) quality information of a PC5 path between the remote UE and the at least one third relay UE.

(22) The remote UE transmits a first RRC reconfiguration complete message or a first RRC recovery complete message to the first target base station through the second relay UE based on the configuration information of the second relay UE.

(23) In a case that the first RRC reconfiguration complete message or the first RRC recovery complete message is successfully transmitted to the first target base station, the remote UE establishes the indirect path to the first target base station through the second relay UE.

Certainly, it should be noted that, in this implementation, the direct path and the indirect path are controlled by the same first target base station.

In addition, refer to both FIG. 1*d* and FIG. 1*e*. If the direct path supported by the remote UE is in dual connectivity (DC), to be specific, if the direct path includes a master cell group (MCG) path and a secondary cell group (SCG) path, assuming that the direct path is the MCG path, the first RRC reconfiguration message or the first RRC recovery message may further include configuration information (which may be understood as an SN configuration or an SCG configuration) of a third target base station, and the remote UE establishes the SCG path based on the configuration information of the third target base station.

Further, corresponding to the foregoing descriptions of establishing the indirect path based on the direct path, if the terminal has established an indirect path (for example, the indirect path supported by the remote UE does not fail, or the remote UE has established, reestablished, or recovered the indirect path according to (12), (14), and (16)), the remote UE may directly establish, reestablish, or recover the direct path based on the indirect path. This improves configuration efficiency for the direct path, shortens configuration time for the direct path, and improves RRC robustness of the remote UE.

For example, assuming that the UE has established, reestablished, or recovered the direct path according to (12), (14) and (16), to be specific, in a case that the remote UE performs the first operation for the indirect path based on the target relay UE, the remote UE may further perform (24) to (26) to implement the first operation, for example, establishment, reestablishment or recovery, on the indirect path.

(24) The remote UE receives a second RRC reconfiguration message or a second RRC recovery message transmitted by the second target base station.

The second target base station is a base station to which the target relay UE belongs.

The second RRC reconfiguration message includes at least configuration information of a second cell for establishing or reestablishing the direct path. The second RRC recovery message includes at least configuration information of the second cell for recovering the direct path.

In an implementation, the second cell may be selected by the second target base station from relay UEs cached by the second target base station, or may be selected based on at least one third cell that is received and that is reported by the remote UE, or may be selected comprehensively based on cell information cached by the second target base station and the at least one third cell reported by the remote UE. This is not limited in this embodiment.

To be specific, before receiving the second RRC reconfiguration message or the second RRC recovery message transmitted by the second target base station, the remote UE may report related information of the at least one third cell to the second target base station for the second target base station to select the second cell.

Optionally, the at least one third cell may include at least one of the following (241) and (242):

(241) at least some of the at least one first cell; and (242) at least one fourth cell that is determined by the remote UE based on a measurement configuration of the second target base station and that meets a second measurement reporting event.

In addition, the related information of the at least one third cell may include at least one of the following (243) and (244):

(243) identification information of the at least one third cell; and (244) quality information of a Uu path between the remote UE and the at least one third cell.

(25) The remote UE transmits a second RRC reconfiguration complete message or a second RRC recovery complete message to the second target base station through the second cell based on the configuration information of the second cell.

(26) In a case that the second RRC reconfiguration complete message or the second RRC recovery complete message is successfully transmitted to the second target base station, the remote UE establishes the direct path to the second target base station.

Certainly, it should be noted that, in this implementation, the direct path and the indirect path are controlled by the same second target base station.

In addition, still refer to both FIG. 1*d* and FIG. 1*e*. If the direct path supported by the remote UE is in DC, to be specific, if the direct path includes an MCG path and an SCG path, assuming that the direct path is the MCG path, the second RRC reconfiguration message or the second RRC recovery message may further include configuration information (which may be understood as an SN configuration or an SCG configuration) of a fourth target base station, and the remote UE establishes the SCG path based on the configuration information of the fourth target base station.

Figure 4:
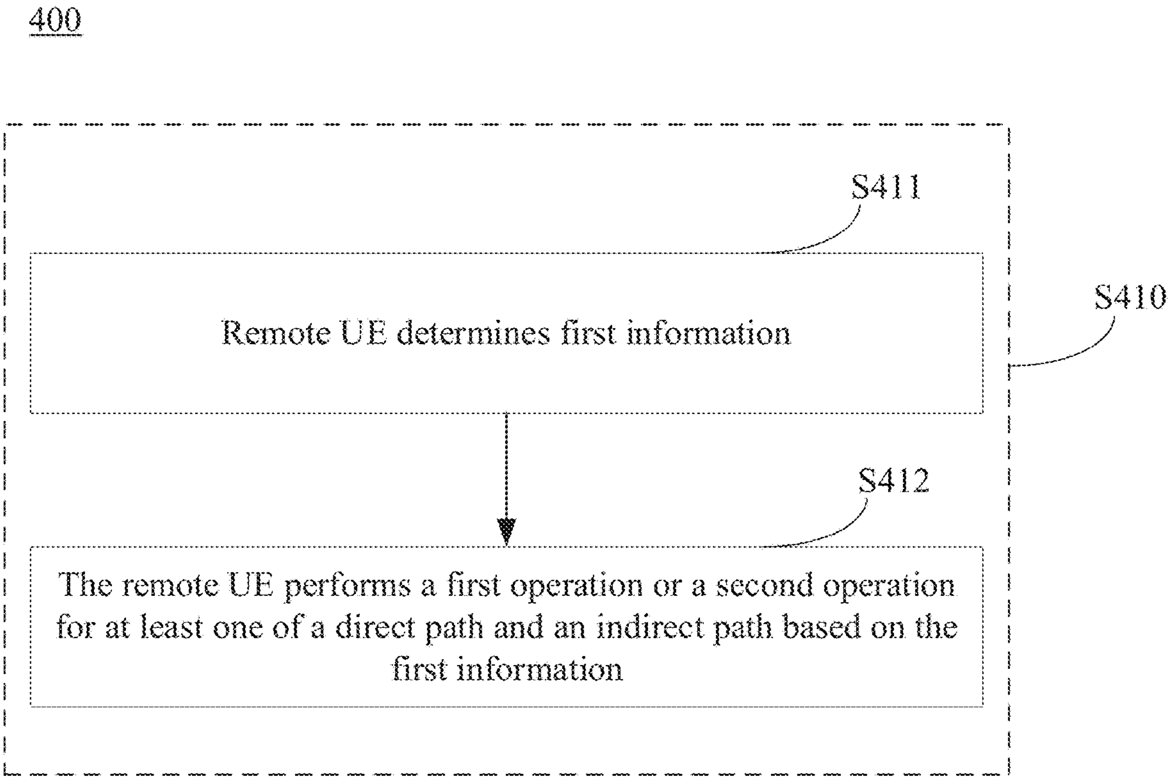
FIG. 4 is a third schematic flowchart of a communication path configuration method according to an exemplary embodiment of this application.

FIG. 4 is a schematic flowchart of a communication path configuration method 400 according to an exemplary embodiment of this application. The method 400 may be performed by remote UE but is not limited thereto, and may be specifically performed by hardware and/or software installed in the remote UE. In this embodiment, the method 400 may include at least the following steps.

S410: The remote UE performs a first operation or a second operation for at least one of a direct path and an indirect path.

The remote UE communicates with the network side through the direct path and the indirect path.

The first operation includes an establishment operation, a reestablishment operation, or a first recovery operation. The second operation includes a second recovery operation. The second recovery operation includes an operation of recovering, by the remote UE, the indirect path through the direct path, or an operation of recovering, by the remote UE, the direct path through the indirect path.

It can be understood that, for an implementation process of S410, reference may be made to related descriptions in the method embodiment 200 and/or the method embodiment 300. In addition, still as shown in FIG. 4, in a possible implementation, the step of performing, by the remote UE, a first operation or a second operation for at least one of a direct path and an indirect path may be implemented in S411 and S412. Content is as follows:

S411: The remote UE determines first information.

The first information includes at least one of the following (31) and (32).

(31) Whether the direct path meets a direct path failure condition.

Optionally, the direct path failure condition includes at least one of the following (311) and (312).

(311) A Uu radio link failure occurs on the remote UE.

(312) A Uu radio link recovery failure occurs on the remote UE.

(32) Whether the indirect path meets an indirect path failure condition.

Optionally, the indirect path failure condition may include at least one of the following (321) to (323).

(321) A PC5 radio link failure occurs between the remote UE and relay UE.

(322) A PC5 radio link release occurs between the remote UE and the relay UE.

(323) The remote UE receives first indication information from the relay UE, where the first indication information is transmitted by the relay UE in a case that a first condition is met, and the first condition includes at least one of the following: A Uu radio link failure occurs on the relay UE, a Uu radio link recovery failure occurs on the relay UE, a Uu handover occurs on the relay UE, and a Uu handover failure occurs on the relay UE.

In this embodiment, the first information, the direct path failure condition, and the indirect path failure condition may be all implemented through agreement in a protocol, higher-layer configuration, or network-side configuration. This is not limited herein.

S412: The remote UE performs the first operation or the second operation for at least one of the direct path and the indirect path based on the first information.

In a possible implementation, the step of performing, by the remote UE, the first operation or the second operation for at least one of the direct path and the indirect path based on the first information may include any one of the following (41) to (43).

(41) In a case that the direct path meets the direct path failure condition and the indirect path does not meet the indirect path failure condition, the remote UE performs the operation of recovering the direct path through the indirect path.

In an implementation, for a process of recovering, by the remote UE, the direct path through the indirect path, refer to related descriptions of recovering, by the remote UE, the direct path based on the indirect path in the method embodiment 300. To avoid repetition, details are not described herein again.

In another implementation, the remote UE may alternatively determine a manner of recovering the direct path based on whether a fifth target base station corresponding to the indirect path supports an RRC process of recovering the direct path through the indirect path, for example, as described in the following (411) and (412). It can be understood that, in this embodiment, the remote UE may determine, based on whether a first timer is configured, whether the fifth target base station supports the RRC process of recovering the direct path through the indirect path. If the first timer is configured, it is determined that the fifth target base station supports the RRC process of recovering the direct path through the indirect path; otherwise, the fifth target base station does not support the RRC process of recovering the direct path through the indirect path. The first timer is used to indicate validity duration of the RRC process of recovering, by the remote UE, the direct path through the indirect path. In addition, the timer mentioned in the context of this application may be configured by a base station (for example, configured by using broadcast signaling or configured by using RRC dedicated signaling) and run on the remote UE.

(411) In a case that the fifth target base station corresponding to the indirect path supports the RRC process of recovering the direct path through the indirect path, the remote UE performs the operation of recovering the direct path through the indirect path.

A process of recovering the direct path through the indirect path may include the following (4111) to (4113). Content is as follows:

(4111) The remote UE reports, to the fifth target base station corresponding to the indirect path, a direct path failure message corresponding to the direct path, and starts the first timer.

(4112) The remote UE stops the first timer in the case of receiving a third RRC reconfiguration message transmitted by the fifth target base station, where the third RRC reconfiguration message includes at least configuration information of one fifth cell, and the configuration information of the fifth cell is used to indicate the remote UE to establish the direct path to a sixth target base station to which the fifth cell belongs.

Optionally, the configuration information of the fifth cell may be determined by the fifth target base station based on cell information cached by the fifth target base station, or may be determined based on cell information reported by the remote UE. This is not limited herein.

It should be noted that the fifth target base station corresponding to the indirect path may be the same as or different from the sixth target base station to which the fifth cell belongs. Certainly, in a case that the fifth target base station is different from the sixth target base station, the configuration information of the fifth cell that is included in the third RRC reconfiguration message may be generated by the sixth target base station and then transmitted to the fifth target base station.

In addition, based on different communication scenarios, the fifth target base station may be the same as or different from the first target base station or the second target base station in the foregoing method embodiments, and correspondingly, the sixth target base station may be the same as or different from the first target base station or the second target base station.

(4113) In a case that the first timer expires, the remote UE performs the reestablishment operation to reestablish the direct path.

(412) In a case that the fifth target base station corresponding to the indirect path does not support the RRC process of recovering the direct path through the indirect path, the remote UE performs the reestablishment operation to reestablish the direct path.

It should be noted that, for the reestablishment operation in (4113) and (412), reference may be made to related descriptions in the method embodiment 200 and/or the method embodiment 300. To avoid repetition, details are not described herein again.

(42) In a case that the direct path does not meet the direct path failure condition and the indirect path meets the indirect path failure condition, the remote UE performs the operation of recovering the indirect path through the direct path.

In an implementation, for a process of recovering, by the remote UE, the indirect path through the direct path, refer to related descriptions of recovering, by the remote UE, the indirect path based on the direct path in the method embodiment 300. To avoid repetition, details are not described herein again.

In another implementation, the remote UE may alternatively determine a manner of recovering the indirect path based on whether a seventh target base station corresponding to the direct path supports an RRC process of recovering the indirect path through the direct path, for example, as described in the following (421) and (422). It can be understood that, in this embodiment, the remote UE may determine, based on whether a second timer is configured, whether the seventh target base station supports the RRC process of recovering the indirect path through the direct path. If the second timer is configured, it is determined that the seventh target base station supports the RRC process of recovering the indirect path through the direct path; otherwise, the seventh target base station does not support the RRC process of recovering the indirect path through the direct path. The second timer is used to indicate validity duration of the RRC process of recovering, by the remote UE, the indirect path through the direct path.

(421) In a case that the seventh target base station corresponding to the direct path supports the RRC process of recovering the indirect path through the direct path, the remote UE performs the operation of recovering the indirect path through the direct path.

A process of recovering the indirect path through the direct path may include the following (4211) to (4213).

(4211) The remote UE reports, to the seventh target base station corresponding to the direct path, an indirect path failure message corresponding to the indirect path, and starts the second timer.

(4212) The remote UE stops the second timer in the case of receiving a fourth RRC reconfiguration message transmitted by the seventh target base station, where the fourth RRC reconfiguration message includes at least configuration information of one fifth relay UE, and the configuration information of the fifth relay UE is used to indicate the remote UE to establish the indirect path to an eighth target base station to which the fifth relay UE belongs.

Optionally, the configuration information of the fifth relay UE may be determined by the seventh target base station based on relay UE information cached by the seventh target base station, or may be determined based on relay UE information reported by the remote UE. This is not limited herein.

It should be noted that the seventh target base station corresponding to the direct path may be the same as or different from the eighth target base station to which the fifth relay UE belongs. Certainly, in a case that the seventh target base station is different from the eighth target base station, the configuration information of the fifth relay UE that is included in the fourth RRC reconfiguration message may be generated by the eighth target base station and then transmitted to the seventh target base station.

In addition, based on different communication scenarios, the seventh target base station may be the same as or different from the first target base station or the second target base station in the foregoing method embodiments, and correspondingly, the eighth target base station may be the same as or different from the first target base station or the second target base station.

(4213) In a case that the second timer expires, the remote UE performs the reestablishment operation to reestablish the indirect path.

(422) In a case that the seventh target base station corresponding to the direct path does not support the RRC process of recovering the indirect path through the direct path, the remote UE performs the reestablishment operation to reestablish the indirect path.

It should be noted that, for the reestablishment operation in (4213) and (422), reference may be made to related descriptions in the method embodiment 200 and/or the method embodiment 300. To avoid repetition, details are not described herein again.

(43) In a case that the direct path meets the direct path failure condition and the indirect path meets the indirect path failure condition, the remote UE performs the reestablishment operation.

For related descriptions of the reestablishment operation, refer to related descriptions in the method embodiment 200 and/or the method embodiment 300. To avoid repetition, details are not described herein again.

In this embodiment, the remote UE performs, based on the first information, the operation of recovering the indirect path through the direct path or the operation of recovering the direct path through the indirect path to recover a corresponding path. This can effectively shorten path recovery time and improve RRC robustness of the remote UE.

Figure 5:
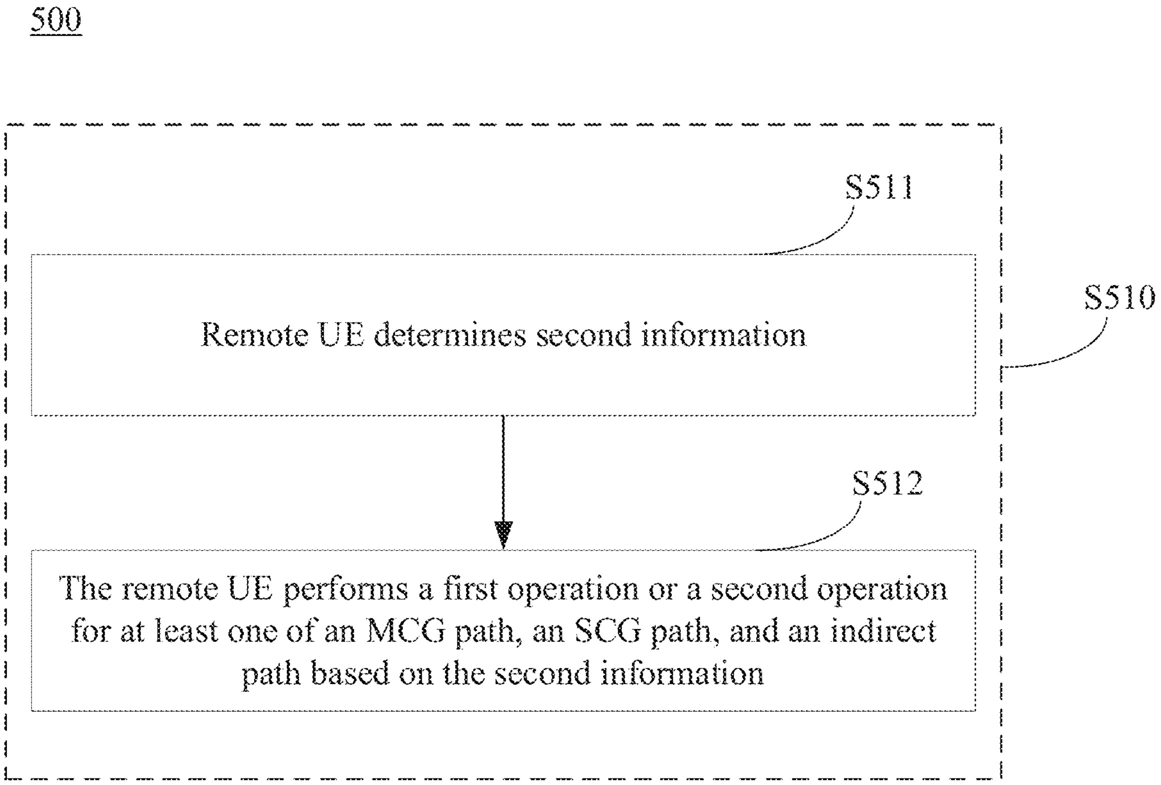
FIG. 5 is a fourth schematic flowchart of a communication path configuration method according to an exemplary embodiment of this application.

FIG. 5 is a schematic flowchart of a communication path configuration method 500 according to an exemplary embodiment of this application. The method 500 may be performed by remote UE but is not limited thereto, and may be specifically performed by hardware and/or software installed in the remote UE. In this embodiment, the method 500 may include at least the following steps.

S510: The remote UE performs a first operation or a second operation for at least one of a direct path and an indirect path.

The remote UE communicates with the network side through the direct path and the indirect path.

The first operation includes an establishment operation, a reestablishment operation, or a first recovery operation. The second operation includes a second recovery operation. The second recovery operation includes an operation of recovering, by the remote UE, the indirect path through the direct path, or an operation of recovering, by the remote UE, the direct path through the indirect path.

It can be understood that, for an implementation process of S510, reference may be made to related descriptions in the method embodiments 200, 300 and 400. In addition, in a possible implementation, the direct path of the remote UE is in dual connectivity (DC). To be specific, the direct path may include an MCG path and an SCG path. Correspondingly, the second operation may include an operation of recovering, by the remote UE, the SCG path through the MCG path, or an operation of recovering, by the remote UE, the MCG path through the SCG path, or an operation of recovering, by the remote UE, the indirect path through the MCG path, or an operation of recovering, by the remote UE, the indirect path through the SCG path, or an operation of recovering, by the remote UE, the MCG path through the indirect path, or an operation of recovering, by the remote UE, the SCG path through the indirect path.

In this case, still as shown in FIG. 5, the step of performing, by the remote UE, a first operation or a second operation for at least one of a direct path and an indirect path may include S511 and S512. Content is as follows:

S511: The remote UE determines second information.

Optionally, the second information includes at least one of the following (51) to (53).

(51) Whether the MCG path meets an MCG path failure condition.

The MCG path failure condition includes at least one of the following (511) and (512).

(511) A Uu radio link failure occurs on the remote UE.

(512) A Uu radio link recovery failure occurs on the remote UE.

(52) Whether the SCG path meets an SCG path failure condition.

The SCG path failure condition includes: An SCG failure occurs on the remote UE.

(53) Whether the indirect path meets an indirect path failure condition.

The indirect path failure condition may include at least one of the following (531) to (533).

(531) A PC5 radio link failure occurs between the remote UE and relay UE.

(532) A PC5 radio link release occurs between the remote UE and the relay UE.

(533) The remote UE receives first indication information from the relay UE, where the first indication information is transmitted by the relay UE in a case that a first condition is met, and the first condition includes at least one of the following: A Uu radio link failure occurs on the relay UE, a Uu radio link recovery failure occurs on the relay UE, a Uu handover occurs on the relay UE, and a Uu handover failure occurs on the relay UE.

It can be understood that the second information, the MCG path failure condition, and the indirect path failure condition may be agreed upon in a protocol, configured by a higher layer, or configured by a network-side device. This is not limited herein.

S512: The remote UE performs the first operation or the second operation for at least one of the MCG path, the SCG path, and the indirect path based on the second information.

In an implementation, the step of performing, by the remote UE, the first operation or the second operation for at least one of the MCG path, the SCG path, and the indirect path based on the second information includes any one of the following (61) to (67).

(61) In a case that the MCG path meets the MCG path failure condition, the SCG path meets the SCG path failure condition, and the indirect path does not meet the indirect path failure condition, the remote UE performs a step of recovering the MCG path through the indirect path, and/or the remote UE performs an operation of recovering the SCG path through the indirect path.

In a case that the remote UE performs the operation of recovering the MCG path through the indirect path, the remote UE may determine a manner of recovering the MCG path based on whether a ninth target base station corresponding to the indirect path supports an RRC process of recovering the MCG path through the indirect path, for example, as described in the following (611) and (612). It can be understood that, in this embodiment, the remote UE may determine, based on whether a third timer is configured, whether the ninth target base station supports the RRC process of recovering the MCG path through the indirect path. If the third timer is configured, it is determined that the ninth target base station supports the RRC process of recovering the MCG path through the indirect path; otherwise, the ninth target base station does not support the RRC process of recovering the MCG path through the indirect path. The third timer is used to indicate validity duration of the RRC process of recovering, by the remote UE, the MCG path through the indirect path.

(611) In a case that the ninth target base station corresponding to the indirect path supports the RRC process of recovering the MCG path through the indirect path, the remote UE performs the operation of recovering the MCG path through the indirect path.

A process of recovering, by the remote UE, the MCG path through the indirect path may include the following (6111) to (6113). Content is as follows:

(6111) The remote UE reports, to the ninth target base station corresponding to the indirect path, an MCG direct connection failure message corresponding to the MCG path, and starts the third timer.

(6112) The remote UE stops the third timer in the case of receiving a fifth RRC reconfiguration message transmitted by the ninth target base station, where the fifth RRC reconfiguration message includes configuration information of at least one sixth cell, and the configuration information of the sixth cell is used to indicate the remote UE to establish the MCG path to a tenth target base station to which the sixth cell belongs.

Optionally, the configuration information of the sixth cell may be determined by the ninth target base station based on cell information cached by the ninth target base station, or may be determined based on cell information reported by the remote UE. This is not limited herein.

It should be noted that the ninth target base station corresponding to the indirect path may be the same as or different from the tenth target base station to which the sixth cell belongs. Certainly, in a case that the ninth target base station is different from the tenth target base station, the configuration information of the sixth cell that is included in the fifth RRC reconfiguration message may be generated by the tenth target base station and then transmitted to the ninth target base station.

(6113) In a case that the third timer expires, the remote UE performs the reestablishment operation to reestablish the MCG path.

(612) In a case that the ninth target base station corresponding to the indirect path does not support the RRC process for recovering the MCG path through the indirect path, the remote UE performs the reestablishment operation to reestablish the MCG path.

It should be noted that, for the reestablishment operation in (6113) and (612), reference may be made to related descriptions of reestablishing the direct path in the method embodiments 200 to 400. To avoid repetition, details are not described herein again.

In addition, based on different communication scenarios, the ninth target base station may be the same as or different from the first target base station or the second target base station in the foregoing method embodiments, and correspondingly, the tenth target base station may be the same as or different from the first target base station or the second target base station.

Further, in a case that the remote UE performs the operation of recovering the SCG path through the indirect path, the remote UE may determine a manner of recovering the SCG path based on whether a ninth target base station corresponding to the indirect path supports an RRC process of recovering the SCG path through the indirect path, for example, as described in the following (613) and (614). It can be understood that, in this embodiment, the remote UE may determine, based on whether a sixth timer is configured, whether the ninth target base station supports the RRC process of recovering the SCG path through the indirect path. If the sixth timer is configured, it is determined that the ninth target base station supports the RRC process of recovering the SCG path through the indirect path; otherwise, the ninth target base station does not support the RRC process of recovering the SCG path through the indirect path. The sixth timer is used to indicate validity duration of the RRC process of recovering, by the remote UE, the SCG path through the indirect path.

(613) In a case that the ninth target base station corresponding to the indirect path supports the RRC process of recovering the MCG path through the indirect path, the remote UE performs the operation of recovering the MCG path through the indirect path.

Optionally, a process of recovering, by the remote UE, the SCG path through the indirect path may include the following (6131) to (6133). Content is as follows:

(6131) The remote UE reports, to the ninth target base station corresponding to the indirect path, an SCG direct connection failure message corresponding to the SCG path, and starts the sixth timer.

(6132) The remote UE stops the sixth timer in the case of receiving a fifth RRC reconfiguration message transmitted by the ninth target base station, where the fifth RRC reconfiguration message includes configuration information of at least one sixth cell, and the configuration information of the sixth cell is used to indicate the remote UE to establish the SCG path to a fifteenth target base station to which the sixth cell belongs.

Optionally, the configuration information of the sixth cell may be determined by the ninth target base station based on cell information cached by the ninth target base station, or may be determined based on cell information reported by the remote UE. This is not limited herein.

It should be noted that the ninth target base station corresponding to the indirect path may be the same as or different from the fifteenth target base station to which the sixth cell belongs. Certainly, in a case that the ninth target base station is different from the fifteenth target base station, the configuration information of the sixth cell that is included in the fifth RRC reconfiguration message may be generated by the fifteenth target base station and then transmitted to the ninth target base station.

(6133) In a case that the sixth timer expires, the remote UE performs the reestablishment operation to reestablish the SCG path.

(614) In a case that the ninth target base station corresponding to the indirect path does not support the RRC process for recovering the SCG path through the indirect path, the remote UE performs the reestablishment operation to reestablish the SCG path.

It should be noted that, for the reestablishment operation in (6133) and (614), reference may be made to related descriptions of reestablishing the direct path in the method embodiment 200 and/or the method embodiment 300. To avoid repetition, details are not described here again.

In addition, based on different communication scenarios, the ninth target base station may be the same as or different from the first target base station or the second target base station in the foregoing method embodiments, and correspondingly, the fifteenth target base station may be the same as or different from the first target base station or the second target base station.

(62) In a case that the MCG path meets the MCG path failure condition, the SCG path does not meet the SCG path failure condition, and the indirect path does not meet the indirect path failure condition, the remote UE performs the operation of recovering the MCG path through the SCG path, or the remote UE performs an operation of recovering the MCG path through the indirect path.

For the performing, by the remote UE, the operation of recovering the MCG path through the SCG path, refer to an existing MCG recovery process. This is not limited in this application.

In addition, for an implementation process of performing, by the remote UE, the operation of recovering the MCG path through the indirect path, refer to related descriptions in (611) and (612). To avoid repetition, details are not described herein again.

Further, in a scenario in which the MCG path meets the MCG path failure condition, the SCG path does not meet the SCG path failure condition, and the indirect path does not meet the indirect path failure condition, the remote UE determines a manner of recovering the MCG path based on one of random selection, network configuration, or stipulation in a protocol.

For example, assuming that third information is configured by the network, the remote UE may determine, based on the third information configured by the network, whether to recover the MCG path through the SCG path or recover the MCG path through the indirect path.

The third information may include at least one of the following (623) to (625).

(623) Second indication information, where the second indication information is used to indicate, to the remote UE, whether to recover the MCG path through the SCG path or recover the MCG path through the indirect path.

The second indication information may be 1-bit indication information configured by the network. This is not limited herein.

(624) A first threshold, where the first threshold is a Uu link quality threshold for the SCG path.

It should be noted that the link quality mentioned in this application may be determined based on a parameter, for example, reference signal received power (RSRP).

(625) A second threshold, where the second threshold is a PC5 link quality threshold for the indirect path.

Based on this, a step of determining, by the remote UE based on Uu link quality of the SCG path and/or PC5 link quality of the indirect path, whether to recover the MCG path through the SCG path or recover the MCG path through the indirect path includes any one of (6251) to (6256).

(6251) Assuming that the first threshold is configured by the network, in a case that the Uu link quality of the SCG path meets the first threshold, the remote UE performs the operation of recovering the MCG path through the SCG path.

(6252) Assuming that the first threshold is configured by the network, in a case that the Uu link quality of the SCG path does not meet the first threshold, the remote UE performs the operation of recovering the MCG path through the indirect path.

(6253) Assuming that the second threshold is configured by the network, in a case that the PC5 link quality of the indirect path meets the second threshold, the remote UE performs the operation of recovering the MCG path through the indirect path.

(6254) Assuming that the second threshold is configured by the network, in a case that the PC5 link quality of the indirect path does not meet the second threshold, the remote UE performs the operation of recovering the MCG path through the SCG path.

(6255) Assuming that the first threshold and the second threshold are configured by the network, in a case that the Uu link quality of the SCG path meets the first threshold and the PC5 link quality of the indirect path does not meet the second threshold, the remote UE performs the operation of recovering the MCG path through the SCG path.

(6256) Assuming that the first threshold and the second threshold are configured by the network, in a case that the Uu link quality of the SCG path does not meet the first threshold and the PC5 link quality of the indirect path meets the second threshold, the remote UE performs the operation of recovering the MCG path through the indirect path.

(63) In a case that the MCG path meets the MCG path failure condition, the SCG path does not meet the SCG path failure condition, and the indirect path meets the indirect path failure condition, the remote UE performs the operation of recovering the MCG path through the SCG path, and/or the remote UE performs an operation of recovering the indirect path through the SCG path.

It can be understood that, for an implementation process of performing, by the remote UE, the operation of recovering the MCG path through the SCG path, reference may be made to related descriptions in (62). To avoid repetition, details are not described herein again.

In addition, in a case that the remote UE performs the operation of recovering the indirect path through the SCG path, the remote UE may determine a manner of recovering the indirect path based on whether a thirteenth target base station corresponding to the SCG path supports an RRC process of recovering the indirect path through the SCG path, for example, as described in the following (631) and (632). It can be understood that, in this embodiment, the remote UE may determine, based on whether a fifth timer is configured, whether the thirteenth target base station supports the RRC process of recovering the indirect path through the SCG path. If the fifth timer is configured, it is determined that the thirteenth target base station supports the RRC process of recovering the indirect path through the SCG path; otherwise, the thirteenth target base station does not support the RRC process of recovering the indirect path through the SCG path. The fifth timer is used to indicate validity duration of the RRC process of recovering, by the remote UE, the indirect path through the SCG path.

(631) In a case that the thirteenth target base station corresponding to the SCG path supports recovery of the indirect path through the SCG path, the remote UE performs the operation of recovering the indirect path through the SCG path.

Optionally, a process of recovering, by the remote UE, the indirect path through the SCG path may include the following (6311) to (6313). Content is as follows:

(6311) The remote UE reports, to the thirteenth target base station corresponding to the SCG path, an indirect path failure message corresponding to the indirect path, and starts the fifth timer.

(6312) The remote UE stops the fifth timer in the case of receiving a sixth RRC reconfiguration message transmitted by the thirteenth target base station corresponding to the SCG path, where the sixth RRC reconfiguration message includes at least configuration information of one eighth relay UE, and the configuration information of the eighth relay UE is used to indicate the remote UE to establish the indirect path to a fourteenth target base station to which the eighth relay UE belongs.

Optionally, the configuration information of the eighth relay UE may be determined by the thirteenth target base station based on relay UE information cached by the thirteenth target base station, or may be determined based on relay UE information reported by the remote UE. This is not limited herein.

It should be noted that the thirteenth target base station corresponding to the direct path may be the same as or different from the fourteenth target base station to which the eighth relay UE belongs. Certainly, in a case that the thirteenth target base station is different from the fourteenth target base station, the configuration information of the eighth relay UE that is included in the sixth RRC reconfiguration message may be generated by the fourteenth target base station and then transmitted to the thirteenth target base station.

(6313) In a case that the fifth timer expires, the remote UE performs the reestablishment operation to recover the indirect path.

(632) In a case that the thirteenth target base station corresponding to the SCG path does not support recovery of the indirect path through the SCG path, the remote UE performs the reestablishment operation to recover the indirect path.

It should be noted that, for the reestablishment operation in (6313) and (632), reference may be made to related descriptions of reestablishing the direct path in the method embodiment 200 and/or the method embodiment 300. To avoid repetition, details are not described here again.

In addition, based on different communication scenarios, the thirteenth target base station may be the same as or different from the first target base station, the second target base station, the third target base station, or the fourth target base station in the foregoing method embodiments, and correspondingly, the fourteenth target base station may be the same as or different from the first target base station, the second target base station, the third target base station, or the fourth target base station.

(64) In a case that the MCG path meets the MCG path failure condition, the SCG path meets the SCG path failure condition, and the indirect path meets the indirect path failure condition, the remote UE performs the reestablishment operation to reestablish at least one of the MCG path, the SCG path, and the indirect path.

For an implementation process of the reestablishment operation, refer to related descriptions in the method embodiments 200 to 400. To avoid repetition, details are not described herein again.

(65) In a case that the indirect path meets the indirect path failure condition, the MCG path does not meet the MCG path failure condition, and the SCG path meets the SCG path failure condition, the remote UE performs an operation of recovering the indirect path through the MCG path, and/or the remote UE performs the operation of recovering the SCG path through the MCG path.

In a case that the remote UE performs the operation of recovering the indirect path through the MCG path, the remote UE may determine a manner of recovering the indirect path based on whether an eleventh target base station corresponding to the MCG path supports an RRC process of recovering the indirect path through the MCG path, for example, as described in the following (651) and (652). It can be understood that, in this embodiment, the remote UE may determine, based on whether a fourth timer is configured, whether the eleventh target base station supports the RRC process of recovering the indirect path through the MCG path. If the fourth timer is configured, it is determined that the eleventh target base station supports the RRC process of recovering the indirect path through the MCG path; otherwise, the eleventh target base station does not support the RRC process of recovering the indirect path through the MCG path. The fourth timer is used to indicate validity duration of the RRC process of recovering, by the remote UE, the indirect path through the MCG path.

(651) In a case that the eleventh target base station corresponding to the MCG path supports the RRC process of recovering the indirect path through the MCG path, the remote UE performs the operation of recovering the indirect path through the MCG path.

A process of recovering, by the remote UE, the indirect path through the MCG path may include the following (6511) to (6513). Content is as follows:

(6511) The remote UE reports, to the eleventh target base station corresponding to the MCG path, an indirect path failure message corresponding to the indirect path, and starts the fourth timer.

(6512) The remote UE stops the fourth timer in the case of receiving a sixth RRC reconfiguration message transmitted by the eleventh target base station, where the sixth RRC reconfiguration message includes at least configuration information of one sixth relay UE, and the configuration information of the sixth relay UE is used to indicate the remote UE to establish the indirect path to a twelfth target base station to which the sixth relay UE belongs.

Optionally, the configuration information of the sixth relay UE may be determined by the eleventh target base station based on relay UE information cached by the eleventh target base station, or may be determined based on relay information reported by the remote UE. This is not limited herein.

It should be noted that the eleventh target base station corresponding to the indirect path may be the same as or different from the twelfth target base station to which the sixth relay UE belongs. Certainly, in a case that the eleventh target base station is different from the twelfth target base station, the configuration information of the sixth relay UE that is included in the sixth RRC reconfiguration message may be generated by the twelfth target base station and then transmitted to the eleventh target base station.

(6513) In a case that the fourth timer expires, the remote UE performs the reestablishment operation to reestablish the indirect path.

(652) In a case that the eleventh target base station corresponding to the MCG path does not support the RRC process of recovering the indirect path through the MCG path, the remote UE performs the reestablishment operation to reestablish the indirect path.

It should be noted that, for an implementation process of the reestablishment operation in (6513) and (652), reference may be made to related descriptions in the method embodiments 200 to 400. To avoid repetition, details are not described herein again.

In addition, for a process of performing, by the remote UE, the operation of recovering the SCG path through the MCG path, reference may be made to related descriptions in the method embodiments 200 to 400. To avoid repetition, details are not described herein again.

(66) In a case that the indirect path meets the indirect path failure condition, the MCG path does not meet the MCG path failure condition, and the SCG path does not meet the SCG path failure condition, the remote UE performs an operation of recovering the indirect path through the MCG path, or performs an operation of recovering the indirect path through the SCG path.

It can be understood that, for an implementation process of performing, by the remote UE, the operation of recovering the indirect path through the MCG path, reference may be made to related descriptions in (651) and (652). To avoid repetition, details are not described herein again.

In addition, for an implementation process of performing, by the remote UE, the operation of recovering the indirect path through the SCG path, refer to related descriptions in (631) and (632). To avoid repetition, details are not described herein again.

In addition, in a scenario in which the indirect path meets the indirect path failure condition, the MCG path does not meet the MCG path failure condition, and the SCG path does not meet the SCG path failure condition, the remote UE may determine a manner of recovering the indirect path through random selection, network configuration, or stipulation in a protocol.

For example, assuming that fourth information is configured by the network, the remote UE may determine, based on the fourth information, whether to recover the indirect path through the MCG path or recover the indirect path through the SCG path.

The fourth information may include at least one of the following (661) to (663).

(661) Third indication information, where the third indication information is used to indicate, to the remote UE, whether to recover the indirect path through the MCG path or recover the indirect path through the SCG path.

For example, the third indication information may be 1-bit indication information configured by the network.

(662) A third threshold, where the third threshold is a Uu link quality threshold for the SCG path.

(663) A fourth threshold, where the fourth threshold is a Uu link quality threshold for the MCG path.

Based on this, a step of determining, by the remote UE based on Uu link quality of the SCG path and/or Uu link quality of the MCG path, whether to recover the indirect path through the MCG path or recover the indirect path through the SCG path may include any one of the following (6631) to (6636).

(6631) In a case that the Uu link quality of the SCG path meets the third threshold, the remote UE performs the operation of recovering the indirect path through the SCG path.

(6632) In a case that the Uu link quality of the SCG path does not meet the third threshold, the remote UE performs the operation of recovering the indirect path through the MCG path.

(6633) In a case that the Uu link quality of the MCG path meets the fourth threshold, the remote UE performs the operation of recovering the indirect path through the MCG path.

(6634) In a case that the Uu link quality of the MCG path does not meet the fourth threshold, the remote UE performs the operation of recovering the indirect path through the SCG path.

(6635) In a case that the Uu link quality of the SCG path meets the third threshold and the Uu link quality of the MCG path does not meet the fourth threshold, the remote UE performs the operation of recovering the indirect path through the SCG path.

(6636) In a case that the Uu link quality of the SCG path does not meet the third threshold and the Uu link quality of the MCG path meets the fourth threshold, the remote UE performs the operation of recovering the indirect path through the MCG path.

(67). In a case that the indirect path meets the indirect path failure condition, the MCG path meets the MCG path failure condition, and the SCG path does not meet the SCG path failure condition, the remote UE performs the operation of recovering the MCG path through the SCG path, and/or the remote UE performs an operation of recovering the indirect path through the SCG path.

For an implementation process of performing, by the remote UE, the operation of recovering the MCG path through the SCG path, refer to related descriptions in (62). For an implementation process of performing, by the remote UE, the operation of recovering the indirect path through the SCG path, refer to related descriptions in (631) and (632). To avoid repetition, details are not described herein again.

In this embodiment, in a scenario in which the direct path of the remote UE includes the MCG path and the SCG path, a manner of recovering the indirect path may be determined based on the second information. This can effectively shorten path recovery time and improve RRC robustness of the remote UE.

It should be noted that the communication path configuration method provided in embodiments of this application may be performed by a communication path configuration apparatus, or by a control module that is in the communication path configuration apparatus and that is configured to perform the communication path configuration method. In embodiments of this application, a communication path configuration apparatus provided in embodiments of this application is described by using an example in which the communication path configuration apparatus performs the communication path configuration method.

Figure 6:
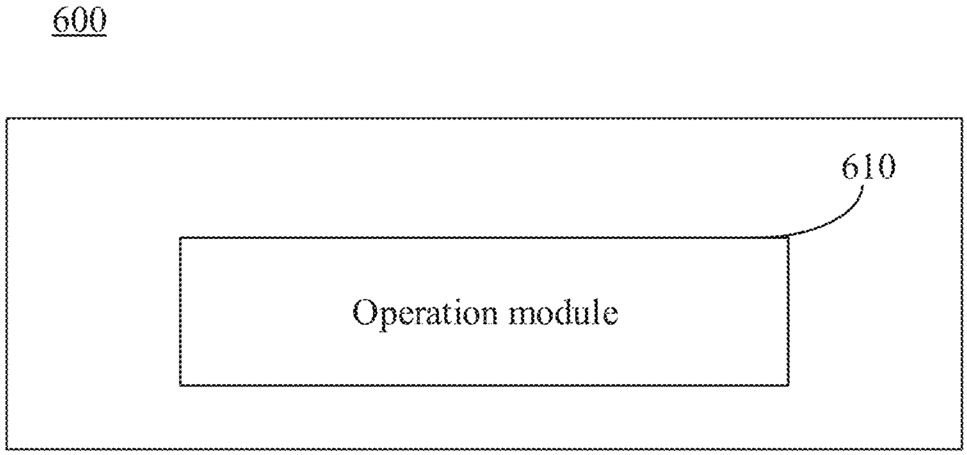
FIG. 6 is a schematic structural diagram of a communication path configuration apparatus according to an exemplary embodiment of this application.

FIG. 6 is a schematic structural diagram of a communication path configuration apparatus 600 according to an exemplary embodiment of this application. The apparatus 600 includes an operation module 610, configured to perform a first operation or a second operation for at least one of a direct path and an indirect path, where remote UE communicates with a network side through the direct path and the indirect path, the first operation includes an establishment operation, a reestablishment operation, or a first recovery operation, the second operation includes a second recovery operation, and the second recovery operation includes an operation of recovering, by the remote UE, the indirect path through the direct path, or an operation of recovering, by the remote UE, the direct path through the indirect path.

Optionally, the apparatus 600 further includes a configuration module, and the configuration module is configured to configure the first operation and/or the second operation.

Optionally, the step of performing, by the operation module 610, a first operation or a second operation for at least one of a direct path and an indirect path includes: performing, by the operation module 610, the first operation for at least one of the direct path and the indirect path in a case that at least one first cell and/or at least one first relay UE is determined. The establishment operation includes: establishing, by the operation module 610, the direct path based on a radio resource control RRC connection establishment process initiated by a target cell; and/or establishing, by the operation module 610, the indirect path based on an RRC connection establishment process initiated by target relay UE. The reestablishment operation includes: reestablishing, by the operation module 610, the direct path based on an RRC connection reestablishment process initiated by the target cell; and/or reestablishing, by the operation module 610, the indirect path based on an RRC connection reestablishment process initiated by the target relay UE. The first recovery operation includes: recovering, by the operation module 610, the direct path based on an RRC connection recovery process initiated by the target cell; and/or recovering, by the operation module 610, the indirect path based on an RRC process initiated by the target relay UE. The at least one first cell is a cell meeting a cell selection or reselection condition. The at least one first relay UE is relay UE meeting a relay selection or reselection condition. The target cell is one of the at least one first cell. The target relay UE is one of the at least one first relay UE.

Optionally, in a case that the operation module 610 performs the first operation for the direct path based on the target cell, the method further includes: receiving, by the operation module 610, a first RRC reconfiguration message or a first RRC recovery message transmitted by a first target base station, where the first RRC reconfiguration message or the first RRC recovery message includes at least configuration information of second relay UE, and the first target base station is a base station to which the target cell belongs;

transmitting, by the operation module 610, a first RRC reconfiguration complete message or a first RRC recovery complete message to the first target base station through the second relay UE based on the configuration information of the second relay UE; and in a case that the first RRC reconfiguration complete message or the first RRC recovery complete message is successfully transmitted to the first target base station, establishing, by the operation module 610, the indirect path to the first target base station through the second relay UE.

Optionally, the operation module 610 is further configured to report related information of at least one third relay UE to the first target base station, where the at least one third relay UE includes at least one of the following: at least some of the at least one first relay UE; and at least one fourth relay UE that is determined by the operation module 610 based on a measurement configuration of the first target base station and that meets a first measurement reporting event.

Optionally, the related information of the at least one third relay UE includes at least one of the following: identification information of the at least one third relay UE; and quality information of a PC5 path between the remote UE and the at least one third relay UE.

Optionally, in the case of performing the first operation for the direct path based on the target relay UE, the operation module 610 receives a second RRC reconfiguration message or a second RRC recovery message transmitted by a second target base station, where the second RRC reconfiguration message or the second RRC recovery message includes at least configuration information of a second cell, and the second target base station is a base station to which the target relay UE belongs; the operation module 610 transmits a second RRC reconfiguration complete message or a second RRC recovery complete message to the second target base station through the second cell based on the configuration information of the second cell; and in a case that the second RRC reconfiguration complete message or the second RRC recovery complete message is successfully transmitted to the second target base station, the operation module 610 establishes the direct path to the second target base station.

Optionally, the operation module 610 is further configured to report related information of at least one third cell to the second target base station, where the at least one third cell includes at least one of the following: at least some of the at least one first cell; and at least one fourth cell that is determined by the operation module 610 based on a measurement configuration of the second target base station and that meets a second measurement reporting event.

Optionally, the related information of the at least one third cell includes at least one of the following: identification information of the at least one third cell; and quality information of a Uu path between the remote UE and the at least one third cell.

Optionally, in a case that the direct path is a master cell group MCG path, and in a case that the first RRC reconfiguration message or the first RRC recovery message further includes configuration information of a third target base station, the operation module 610 establishes a secondary cell group SCG path based on the configuration information of the third target base station; and in a case that the second RRC reconfiguration message or the second RRC recovery message further includes configuration information of a fourth target base station, the operation module 610 establishes an SCG path based on the configuration information of the fourth target base station.

Optionally, the step of performing, by the operation module 610, a first operation or a second operation for at least one of a direct path and an indirect path includes: determining, by the operation module 610, first information; and performing, by the operation module 610, the first operation or the second operation for at least one of the direct path and the indirect path based on the first information, where the first information includes at least one of the following: whether the direct path meets a direct path failure condition; and whether the indirect path meets an indirect path failure condition.

Optionally, the direct path failure condition includes at least one of the following: a Uu radio link failure occurs on the remote UE, and a Uu radio link recovery failure occurs on the remote UE; and/or the indirect path failure condition includes at least one of the following: a PC5 radio link failure occurs between the remote UE and relay UE, a PC5 radio link release occurs between the remote UE and the relay UE, and the remote UE receives first indication information from the relay UE, where the first indication information is transmitted by the relay UE in a case that a first condition is met, and the first condition includes at least one of the following: a Uu radio link failure occurs on the relay UE, a Uu radio link recovery failure occurs on the relay UE, a Uu handover occurs on the relay UE, and a Uu handover failure occurs on the relay UE.

Optionally, the step of performing, by the operation module 610, the first operation or the second operation for at least one of the direct path and the indirect path based on the first information includes any one of the following: in a case that the direct path meets the direct path failure condition and the indirect path does not meet the indirect path failure condition, performing the operation of recovering the direct path through the indirect path; in a case that the direct path does not meet the direct path failure condition and the indirect path meets the indirect path failure condition, performing the operation of recovering the indirect path through the direct path; or in a case that the direct path meets the direct path failure condition and the indirect path meets the indirect path failure condition, performing the reestablishment operation.

Optionally, the step of recovering, by the operation module 610, the direct path through the indirect path includes: performing, by the operation module 610, the operation of recovering the direct path through the indirect path in a case that a fifth target base station corresponding to the indirect path supports an RRC process of recovering the direct path through the indirect path; or performing, by the operation module 610, the reestablishment operation in a case that a fifth target base station corresponding to the indirect path does not support an RRC process of recovering the direct path through the indirect path.

Optionally, the performing, by the operation module 610, the operation of recovering the direct path through the indirect path in a case that a fifth target base station corresponding to the indirect path supports an RRC process of recovering the direct path through the indirect path includes: reporting, by the operation module 610 to the fifth target base station corresponding to the indirect path, a direct path failure message corresponding to the direct path, and starting a first timer, where the first timer is used to indicate validity duration of the RRC process of recovering the direct path through the indirect path; and stopping, by the operation module 610, the first timer in the case of receiving a third RRC reconfiguration message transmitted by the fifth target base station, where the third RRC reconfiguration message includes at least configuration information of one fifth cell, and the configuration information of the fifth cell is used to indicate the remote UE to establish the direct path to a sixth target base station to which the fifth cell belongs.

Optionally, the performing, by the operation module 610, the operation of recovering the direct path through the indirect path in a case that a fifth target base station corresponding to the indirect path supports an RRC process of recovering the direct path through the indirect path further includes: in a case that the first timer expires, performing, by the operation module 610, the reestablishment operation.

Optionally, in a case that the fifth target base station corresponding to the indirect path is different from the sixth target base station to which the fifth cell belongs, the configuration information of the fifth cell that is included in the third RRC reconfiguration message is generated by the sixth target base station and then transmitted to the fifth target base station.

Optionally, the performing, by the operation module 610, the operation of recovering the indirect path through the direct path includes: performing, by the operation module 610, the operation of recovering the indirect path through the direct path in a case that a seventh target base station corresponding to the direct path supports an RRC process of recovering the indirect path through the direct path; or performing, by the operation module 610, the reestablishment operation in a case that a seventh target base station corresponding to the direct path does not support an RRC process of recovering the indirect path through the direct path.

Optionally, the performing, by the operation module 610, the operation of recovering the indirect path through the direct path in a case that a seventh target base station corresponding to the direct path supports an RRC process of recovering the indirect path through the direct path includes: reporting, by the operation module 610 to the seventh target base station corresponding to the direct path, an indirect path failure message corresponding to the indirect path, and starting a second timer, where the second timer is used to indicate validity duration of the RRC process of recovering the indirect path through the direct path; and stopping, by the operation module 610, the second timer in the case of receiving a fourth RRC reconfiguration message transmitted by the seventh target base station, where the fourth RRC reconfiguration message includes at least configuration information of one fifth relay UE, and the configuration information of the fifth relay UE is used to indicate the remote UE to establish the indirect path to an eighth target base station to which the fifth relay UE belongs.

Optionally, the performing, by the operation module 610, the operation of recovering the indirect path through the direct path in a case that a seventh target base station corresponding to the direct path supports an RRC process of recovering the indirect path through the direct path further includes: in a case that the second timer expires, performing, by the operation module 610, the reestablishment operation.

Optionally, in a case that the seventh target base station corresponding to the direct path is different from the eighth target base station to which the fifth relay UE belongs, the fourth RRC reconfiguration message is generated by the eighth target base station and then transmitted to the seventh target base station.

Optionally, the direct path includes an MCG path and an SCG path; and the step of performing, by the operation module 610, a first operation or a second operation for at least one of a direct path and an indirect path includes: determining second information; and performing the first operation or the second operation for at least one of the MCG path, the SCG path, and the indirect path based on the second information, where the second operation further includes an operation of recovering the SCG path through the MCG path, or an operation of recovering the MCG path through the SCG path; and the second information includes at least one of the following: whether the MCG path meets an MCG path failure condition; whether the SCG path meets an SCG path failure condition; and whether the indirect path meets an indirect path failure condition.

Optionally, the MCG path failure condition includes at least one of the following: a Uu radio link failure occurs on the remote UE, and a Uu radio link recovery failure occurs on the remote UE; and/or the SCG path failure condition includes: an SCG failure occurs on the remote UE.

Optionally, the step of performing, by the operation module 610, the first operation or the second operation for at least one of the MCG path, the SCG path, and the indirect path based on the second information includes any one of the following: in a case that the MCG path meets the MCG path failure condition, the SCG path meets the SCG path failure condition, and the indirect path does not meet the indirect path failure condition, performing, by the operation module 610, a step of recovering the MCG path through the indirect path, and/or performing an operation of recovering the SCG path through the indirect path; in a case that the MCG path meets the MCG path failure condition, the SCG path does not meet the SCG path failure condition, and the indirect path does not meet the indirect path failure condition, performing, by the operation module 610, the operation of recovering the MCG path through the SCG path, or performing an operation of recovering the MCG path through the indirect path; in a case that the MCG path meets the MCG path failure condition, the SCG path does not meet the SCG path failure condition, and the indirect path meets the indirect path failure condition, performing, by the operation module 610, the operation of recovering the MCG path through the SCG path, and/or performing an operation of recovering the indirect path through the SCG path; in a case that the MCG path meets the MCG path failure condition, the SCG path meets the SCG path failure condition, and the indirect path meets the indirect path failure condition, performing, by the operation module 610, the reestablishment operation; in a case that the indirect path meets the indirect path failure condition, the MCG path does not meet the MCG path failure condition, and the SCG path meets the SCG path failure condition, performing, by the operation module 610, an operation of recovering the indirect path through the MCG path, and/or performing the operation of recovering the SCG path through the MCG path; in a case that the indirect path meets the indirect path failure condition, the MCG path does not meet the MCG path failure condition, and the SCG path does not meet the SCG path failure condition, performing, by the operation module 610, an operation of recovering the indirect path through the MCG path, or performing an operation of recovering the indirect path through the SCG path; or in a case that the indirect path meets the indirect path failure condition, the MCG path meets the MCG path failure condition, and the SCG path does not meet the SCG path failure condition, performing, by the operation module 610, the operation of recovering the MCG path through the SCG path, and/or performing an operation of recovering the indirect path through the SCG path.

Optionally, in a case that the MCG path meets the MCG path failure condition, the SCG path does not meet the SCG path failure condition, and the indirect path does not meet the indirect path failure condition, the operation module 610 determines, based on one of the following, a manner of recovering the MCG path: random selection, network configuration, or stipulation in a protocol.

Optionally, a step of determining, by the operation module 610 based on the network configuration, a manner of recovering the MCG path includes: determining, by the operation module 610 based on third information configured by the network, whether to recover the MCG path through the SCG path or recover the MCG path through the indirect path, where the third information includes at least one of the following: second indication information, where the second indication information is used to indicate, to the remote UE, whether to recover the MCG path through the SCG path or recover the MCG path through the indirect path; a first threshold, where the first threshold is a Uu link quality threshold for the SCG path; and a second threshold, where the second threshold is a PC5 link quality threshold for the indirect path.

Optionally, a step of determining, by the operation module 610 based on Uu link quality of the SCG path and/or PC5 link quality of the indirect path, whether to recover the MCG path through the SCG path or recover the MCG path through the indirect path includes: in a case that the Uu link quality of the SCG path meets the first threshold, performing, by the operation module 610, the operation of recovering the MCG path through the SCG path; in a case that the Uu link quality of the SCG path does not meet the first threshold, performing, by the operation module 610, the operation of recovering the MCG path through the indirect path; in a case that the PC5 link quality of the indirect path meets the second threshold, performing, by the operation module 610, the operation of recovering the MCG path through the indirect path; in a case that the PC5 link quality of the indirect path does not meet the second threshold, performing, by the operation module 610, the operation of recovering the MCG path through the SCG path; in a case that the Uu link quality of the SCG path meets the first threshold and the PC5 link quality of the indirect path does not meet the second threshold, performing, by the operation module 610, the operation of recovering the MCG path through the SCG path; or in a case that the Uu link quality of the SCG path does not meet the first threshold and the PC5 link quality of the indirect path meets the second threshold, performing, by the operation module 610, the operation of recovering the MCG path through the indirect path.

Optionally, in a case that the indirect path meets the indirect path failure condition, the MCG path does not meet the MCG path failure condition, and the SCG path does not meet the SCG path failure condition, the operation module 610 determines, based on at least one of the following, a manner of recovering the indirect path: random selection, network configuration, or stipulation in a protocol.

Optionally, a step of determining, by the operation module 610 based on the network configuration, a manner of recovering the indirect path includes: determining, by the operation module 610 based on four information configured by the network, whether to recover the indirect path through the MCG path or recover the indirect path through the SCG path, where the fourth information includes at least one of the following: third indication information, where the third indication information is used to indicate, to the remote UE, whether to recover the indirect path through the MCG path or recover the indirect path through the SCG path; a third threshold, where the third threshold is a Uu link quality threshold for the SCG path; and a fourth threshold, where the fourth threshold is a Uu link quality threshold for the MCG path.

Optionally, a step of determining, by the operation module 610 based on Uu link quality of the SCG path and/or Uu link quality of the MCG path, whether to recover the indirect path through the MCG path or recover the indirect path through the SCG path includes: in a case that the Uu link quality of the SCG path meets the third threshold, performing, by the operation module 610, the operation of recovering the indirect path through the SCG path; in a case that the Uu link quality of the SCG path does not meet the third threshold, performing, by the operation module 610, the operation of recovering the indirect path through the MCG path; in a case that the Uu link quality of the MCG path meets the fourth threshold, performing, by the operation module 610, the operation of recovering the indirect path through the MCG path; in a case that the Uu link quality of the MCG path does not meet the fourth threshold, performing, by the remote UE, the operation of recovering the indirect path through the SCG path; in a case that the Uu link quality of the SCG path meets the third threshold and the Uu link quality of the MCG path does not meet the fourth threshold, performing, by the operation module 610, the operation of recovering the indirect path through the SCG path; or in a case that the Uu link quality of the SCG path does not meet the third threshold and the Uu link quality of the MCG path meets the fourth threshold, performing, by the operation module 610, the operation of recovering the indirect path through the MCG path.

Optionally, the performing, by the operation module 610, the operation of recovering the MCG path through the indirect path includes: performing, by the operation module 610, the operation of recovering the MCG path through the indirect path in a case that a ninth target base station corresponding to the indirect path supports an RRC process of recovering the MCG path through the indirect path; or performing, by the operation module 610, the reestablishment operation in a case that a ninth target base station corresponding to the indirect path does not support an RRC process of recovering the MCG path through the indirect path.

Optionally, the performing, by the operation module 610, the operation of recovering the MCG path through the indirect path in a case that a ninth target base station corresponding to the indirect path supports an RRC process of recovering the MCG path through the indirect path includes: reporting, by the operation module 610 to the ninth target base station corresponding to the indirect path, an MCG direct connection failure message corresponding to the MCG path, and starting a third timer, where the third timer is used to indicate validity duration of the RRC process of recovering the MCG path through the indirect path; and stopping, by the operation module 610, the third timer in the case of receiving a fifth RRC reconfiguration message transmitted by the ninth target base station, where the fifth RRC reconfiguration message includes configuration information of at least one sixth cell, and the configuration information of the sixth cell is used to indicate the remote UE to establish the MCG path to a tenth target base station to which the sixth cell belongs.

Optionally, the performing, by the operation module 610, the operation of recovering the indirect path through the MCG path includes: performing, by the operation module 610, the operation of recovering the indirect path through the MCG path in a case that an eleventh target base station corresponding to the MCG path supports an RRC process of recovering the indirect path through the MCG path; or performing, by the operation module 610, the reestablishment operation in a case that an eleventh target base station corresponding to the MCG path does not support an RRC process of recovering the indirect path through the MCG path.

Optionally, the performing, by the operation module 610, the operation of recovering the indirect path through the MCG path in a case that an eleventh target base station corresponding to the MCG path supports an RRC process of recovering the indirect path through the MCG path includes: reporting, by the operation module 610 to the eleventh target base station corresponding to the MCG path, an indirect path failure message corresponding to the indirect path, and starting a fourth timer, where the fourth timer is used to indicate validity duration of the RRC process of recovering the indirect path through the MCG path; and stopping, by the operation module 610, the fourth timer in the case of receiving a sixth RRC reconfiguration message transmitted by the eleventh target base station, where the sixth RRC reconfiguration message includes at least configuration information of one sixth relay UE, and the configuration information of the sixth relay UE is used to indicate the remote UE to establish the indirect path to a twelfth target base station to which the sixth relay UE belongs.

Optionally, the step of recovering, by the operation module 610, the indirect path through the SCG path includes: performing, by the operation module 610, the operation of recovering the indirect path through the SCG path in a case that a thirteenth target base station corresponding to the SCG path supports recovery of the indirect path through the SCG path; or performing, by the operation module 610, the reestablishment operation in a case that a thirteenth target base station corresponding to the SCG path does not support recovery of the indirect path through the SCG path.

Optionally, the performing, by the operation module 610, the operation of recovering the indirect path through the SCG path in a case that a thirteenth target base station corresponding to the SCG path supports recovery of the indirect path through the SCG path includes: reporting, by the operation module 610 to the thirteenth target base station corresponding to the SCG path, an indirect path failure message corresponding to the indirect path, and starting a fifth timer, where the fifth timer is used to indicate validity duration of an RRC process of recovering the indirect path through the SCG path; and stopping, by the operation module 610, the fifth timer in the case of receiving a sixth RRC reconfiguration message transmitted by the thirteenth target base station corresponding to the SCG path, where the sixth RRC reconfiguration message includes at least configuration information of one eighth relay UE, and the configuration information of the eighth relay UE is used to indicate the remote UE to establish the indirect path to a fourteenth target base station to which the eighth relay UE belongs.

The communication path configuration apparatus 600 in this embodiment of this application may be an apparatus, or an apparatus or an electronic device with an operating system, or may be a component, an integrated circuit, or a chip in a terminal. The apparatus or the electronic device may be a mobile terminal or a non-mobile terminal. For example, the mobile terminal may include but is not limited to the aforementioned types of the terminal 11, and the non-mobile terminal may be a server, a network attached storage (NAS), a personal computer (PC), a television (TV), a teller machine, a self-service machine, or the like. This is not specifically limited in this embodiment of this application.

The communication path configuration apparatus 600 provided in this embodiment of this application is capable of implementing the processes implemented in the method embodiments of FIG. 2 to FIG. 5, with the same technical effect achieved. To avoid repetition, details are not described herein again.

Figure 7:
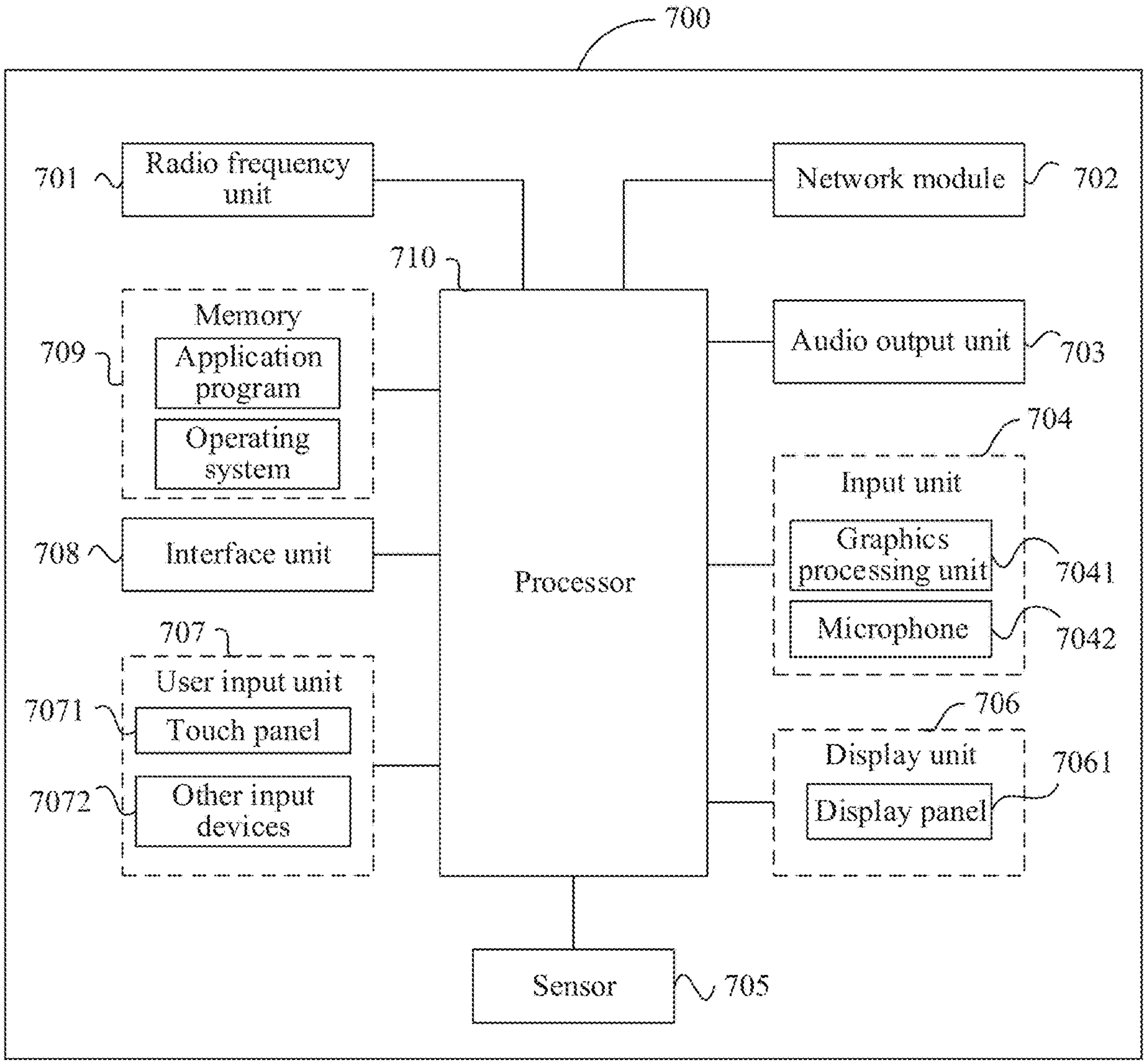
FIG. 7 is a schematic structural diagram of a terminal according to an exemplary embodiment of this application.

An embodiment of this application further provides a terminal, including a processor and a communications interface, where the communications interface is coupled to the processor, and the processor is configured to run a program or instructions to implement the steps of the methods in the method embodiments 200 to 500. The terminal embodiment corresponds to the foregoing terminal—side method embodiment, and all implementation processes and implementations of the foregoing method embodiment are applicable to the terminal embodiment, with the same technical effect achieved. Specifically, FIG. 7 is a schematic diagram of a hardware structure of a terminal for implementing an embodiment of this application.

The terminal 700 includes but is not limited to at least some of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (for example, a battery) that supplies power to each component. The power supply may be logically connected to the processor 710 by using a power management system, to implement functions such as charging management, discharging management, and power consumption management by using the power management system. The terminal structure shown in FIG. 7 does not constitute a limitation on the terminal. The terminal may include more or fewer components than those shown in the figure, or some components may be combined, or there may be a different component layout. Details are not described herein again.

It should be understood that, in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or an on/off key), a trackball, a mouse, and a joystick. Details are not described herein.

In this embodiment of this application, the radio frequency unit 701 receives downlink data from a network-side device and then transmits the downlink data to the processor 710 for processing; and transmits uplink data to the network-side device. Usually, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may mainly include a program or instruction storage region and a data storage region. The program or instruction storage region may store an operating system, an application program or instructions required by at least one function (for example, an audio play function or an image play function), and the like. In addition, the memory 709 may include a high-speed random access memory, or may include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory, or another non-volatile solid-state storage device.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, for example, a baseband processor. It can be understood that the modem processor may alternatively not be integrated in the processor 710.

The processor 710 is configured to perform a first operation or a second operation for at least one of a direct path and an indirect path. The network module 702 is configured to communicate with a network side through the direct path and the indirect path, where the first operation includes an establishment operation, a reestablishment operation, or a first recovery operation, the second operation includes a second recovery operation, and the second recovery operation includes an operation of recovering, by the remote UE, the indirect path through the direct path, or an operation of recovering, by the remote UE, the direct path through the indirect path.

Optionally, the step of performing, by the processor 710, a first operation or a second operation for at least one of a direct path and an indirect path includes: performing the first operation for at least one of the direct path and the indirect path in a case that at least one first cell and/or at least one first relay UE is determined. The establishment operation includes: establishing the direct path based on a radio resource control RRC connection establishment process initiated by a target cell; and/or establishing the indirect path based on an RRC connection establishment process initiated by target relay UE. The reestablishment operation includes: reestablishing the direct path based on an RRC connection reestablishment process initiated by the target cell; and/or reestablishing the indirect path based on an RRC connection reestablishment process initiated by the target relay UE. The first recovery operation includes: recovering the direct path based on an RRC connection recovery process initiated by the target cell; and/or recovering the indirect path based on an RRC process initiated by the target relay UE. The at least one first cell is a cell meeting a cell selection or reselection condition. The at least one first relay UE is relay UE meeting a relay selection or reselection condition. The target cell is one of the at least one first cell. The target relay UE is one of the at least one first relay UE.

Optionally, in a case that the processor 710 performs the first operation for the direct path based on the target cell, the processor 710 receives a first RRC reconfiguration message or a first RRC recovery message transmitted by a first target base station, where the first RRC reconfiguration message or the first RRC recovery message includes at least configuration information of second relay UE, and the first target base station is a base station to which the target cell belongs; the processor 710 transmits a first RRC reconfiguration complete message or a first RRC recovery complete message to the first target base station through the second relay UE based on the configuration information of the second relay UE; and in a case that the first RRC reconfiguration complete message or the first RRC recovery complete message is successfully transmitted to the first target base station, the processor 710 establishes the indirect path to the first target base station through the second relay UE.

Optionally, before the step of receiving, by the remote UE, a first RRC reconfiguration message or a first RRC recovery message transmitted by a first target base station, the method further includes: reporting, by the processor 710, related information of at least one third relay UE to the first target base station, where the at least one third relay UE includes at least one of the following: at least some of the at least one first relay UE; and at least one fourth relay UE that is determined based on a measurement configuration of the first target base station and that meets a first measurement reporting event.

Optionally, the related information of the at least one third relay UE includes at least one of the following: identification information of the at least one third relay UE; and quality information of a PC5 path between the remote UE and the at least one third relay UE.

Optionally, in a case that the processor 710 performs the first operation for the direct path based on the target relay UE, a radio frequency circuit 701 receives a second RRC reconfiguration message or a second RRC recovery message transmitted by a second target base station, where the second RRC reconfiguration message or the second RRC recovery message includes at least configuration information of a second cell, and the second target base station is a base station to which the target relay UE belongs; the processor 710 transmits a second RRC reconfiguration complete message or a second RRC recovery complete message to the second target base station through the second cell based on the configuration information of the second cell; and in a case that the second RRC reconfiguration complete message or the second RRC recovery complete message is successfully transmitted to the second target base station, the processor 710 establishes the direct path to the second target base station.

Optionally, before the step of receiving, by the processor 710, a second RRC reconfiguration message or a second RRC recovery message transmitted by a second target base station, the method further includes: reporting, by the remote UE, related information of at least one third cell to the second target base station, where the at least one third cell includes at least one of the following: at least some of the at least one first cell; and at least one fourth cell that is determined by the processor 710 based on a measurement configuration of the second target base station and that meets a second measurement reporting event.

Optionally, the related information of the at least one third cell includes at least one of the following: identification information of the at least one third cell; and quality information of a Uu path between the remote UE and the at least one third cell.

Optionally, in a case that the direct path is a master cell group MCG path, and in a case that the first RRC reconfiguration message or the first RRC recovery message further includes configuration information of a third target base station, the processor 710 establishes a secondary cell group SCG path based on the configuration information of the third target base station; and in a case that the second RRC reconfiguration message or the second RRC recovery message further includes configuration information of a fourth target base station, the processor 710 establishes an SCG path based on the configuration information of the fourth target base station.

Optionally, the step of performing, by the processor 710, a first operation or a second operation for at least one of a direct path and an indirect path includes: determining first information; and performing the first operation or the second operation for at least one of the direct path and the indirect path based on the first information, where the first information includes at least one of the following: whether the direct path meets a direct path failure condition; and whether the indirect path meets an indirect path failure condition.

Optionally, the direct path failure condition includes at least one of the following: a Uu radio link failure occurs on the remote UE, and a Uu radio link recovery failure occurs on the remote UE; and/or the indirect path failure condition includes at least one of the following: a PC5 radio link failure occurs between the remote UE and relay UE, a PC5 radio link release occurs between the remote UE and the relay UE, and the remote UE receives first indication information from the relay UE, where the first indication information is transmitted by the relay UE in a case that a first condition is met, and the first condition includes at least one of the following: a Uu radio link failure occurs on the relay UE, a Uu radio link recovery failure occurs on the relay UE, a Uu handover occurs on the relay UE, and a Uu handover failure occurs on the relay UE.

Optionally, the step of performing, by the processor 710, the first operation or the second operation for at least one of the direct path and the indirect path based on the first information includes any one of the following: in a case that the direct path meets the direct path failure condition and the indirect path does not meet the indirect path failure condition, performing, by the processor 710, the operation of recovering the direct path through the indirect path; in a case that the direct path does not meet the direct path failure condition and the indirect path meets the indirect path failure condition, performing, by the processor 710, the operation of recovering the indirect path through the direct path; or in a case that the direct path meets the direct path failure condition and the indirect path meets the indirect path failure condition, performing, by the processor 710, the reestablishment operation.

Optionally, the step of recovering, by the processor 710, the direct path through the indirect path includes: performing, by the processor 710, the operation of recovering the direct path through the indirect path in a case that a fifth target base station corresponding to the indirect path supports an RRC process of recovering the direct path through the indirect path; or performing, by the processor 710, the reestablishment operation in a case that a fifth target base station corresponding to the indirect path does not support an RRC process of recovering the direct path through the indirect path.

Optionally, the performing, by the processor 710, the operation of recovering the direct path through the indirect path in a case that a fifth target base station corresponding to the indirect path supports an RRC process of recovering the direct path through the indirect path includes: reporting, by the processor 710 to the fifth target base station corresponding to the indirect path, a direct path failure message corresponding to the direct path, and starting a first timer, where the first timer is used to indicate validity duration of the RRC process of recovering the direct path through the indirect path; and stopping, by the processor 710, the first timer in the case of receiving a third RRC reconfiguration message transmitted by the fifth target base station, where the third RRC reconfiguration message includes at least configuration information of one fifth cell, and the configuration information of the fifth cell is used to indicate the remote UE to establish the direct path to a sixth target base station to which the fifth cell belongs.

Optionally, the performing, by the processor 710, the operation of recovering the direct path through the indirect path in a case that a fifth target base station corresponding to the indirect path supports an RRC process of recovering the direct path through the indirect path further includes: in a case that the first timer expires, performing, by the processor 710, the reestablishment operation.

Optionally, in a case that the fifth target base station corresponding to the indirect path is different from the sixth target base station to which the fifth cell belongs, the configuration information of the fifth cell that is included in the third RRC reconfiguration message is generated by the sixth target base station and then transmitted to the fifth target base station.

Optionally, the performing, by the processor 710, the operation of recovering the indirect path through the direct path includes: performing, by the processor 710, the operation of recovering the indirect path through the direct path in a case that a seventh target base station corresponding to the direct path supports an RRC process of recovering the indirect path through the direct path; or performing, by the processor 710, the reestablishment operation in a case that a seventh target base station corresponding to the direct path does not support an RRC process of recovering the indirect path through the direct path.

Optionally, the performing, by the processor 710, the operation of recovering the indirect path through the direct path in a case that a seventh target base station corresponding to the direct path supports an RRC process of recovering the indirect path through the direct path includes: reporting, by the processor 710 to the seventh target base station corresponding to the direct path, an indirect path failure message corresponding to the indirect path, and starting a second timer, where the second timer is used to indicate validity duration of the RRC process of recovering the indirect path through the direct path; and stopping, by the processor 710, the second timer in the case of receiving a fourth RRC reconfiguration message transmitted by the seventh target base station, where the fourth RRC reconfiguration message includes at least configuration information of one fifth relay UE, and the configuration information of the fifth relay UE is used to indicate the remote UE to establish the indirect path to an eighth target base station to which the fifth relay UE belongs.

Optionally, the performing, by the processor 710, the operation of recovering the indirect path through the direct path in a case that a seventh target base station corresponding to the direct path supports an RRC process of recovering the indirect path through the direct path further includes: in a case that the second timer expires, performing, by the processor 710, the reestablishment operation.

Optionally, in a case that the seventh target base station corresponding to the direct path is different from the eighth target base station to which the fifth relay UE belongs, the fourth RRC reconfiguration message is generated by the eighth target base station and then transmitted to the seventh target base station.

Optionally, the direct path includes an MCG path and an SCG path; and the step of performing, by the processor 710, a first operation or a second operation for at least one of a direct path and an indirect path includes: determining second information; and performing the first operation or the second operation for at least one of the MCG path, the SCG path, and the indirect path based on the second information, where the second operation further includes an operation of recovering the SCG path through the MCG path, or an operation of recovering the MCG path through the SCG path; and the second information includes at least one of the following: whether the MCG path meets an MCG path failure condition; whether the SCG path meets an SCG path failure condition; and whether the indirect path meets an indirect path failure condition.

Optionally, the MCG path failure condition includes at least one of the following: a Uu radio link failure occurs on the remote UE, and a Uu radio link recovery failure occurs on the remote UE; and/or the SCG path failure condition includes: an SCG failure occurs on the remote UE.

Optionally, the step of performing, by the processor 710, the first operation or the second operation for at least one of the MCG path, the SCG path, and the indirect path based on the second information includes any one of the following: in a case that the MCG path meets the MCG path failure condition, the SCG path meets the SCG path failure condition, and the indirect path does not meet the indirect path failure condition, performing, by the processor 710, a step of recovering the MCG path through the indirect path, and/or performing an operation of recovering the SCG path through the indirect path; in a case that the MCG path meets the MCG path failure condition, the SCG path does not meet the SCG path failure condition, and the indirect path does not meet the indirect path failure condition, performing, by the processor 710, the operation of recovering the MCG path through the SCG path, or performing an operation of recovering the MCG path through the indirect path; in a case that the MCG path meets the MCG path failure condition, the SCG path does not meet the SCG path failure condition, and the indirect path meets the indirect path failure condition, performing, by the processor 710, the operation of recovering the MCG path through the SCG path, and/or performing an operation of recovering the indirect path through the SCG path; in a case that the MCG path meets the MCG path failure condition, the SCG path meets the SCG path failure condition, and the indirect path meets the indirect path failure condition, performing, by the processor 710, the reestablishment operation; in a case that the indirect path meets the indirect path failure condition, the MCG path does not meet the MCG path failure condition, and the SCG path meets the SCG path failure condition, performing, by the processor 710, an operation of recovering the indirect path through the MCG path, and/or performing the operation of recovering the SCG path through the MCG path; in a case that the indirect path meets the indirect path failure condition, the MCG path does not meet the MCG path failure condition, and the SCG path does not meet the SCG path failure condition, performing, by the processor 710, an operation of recovering the indirect path through the MCG path, or performing an operation of recovering the indirect path through the SCG path; or in a case that the indirect path meets the indirect path failure condition, the MCG path meets the MCG path failure condition, and the SCG path does not meet the SCG path failure condition, performing, by the processor 710, the operation of recovering the MCG path through the SCG path, and/or performing an operation of recovering the indirect path through the SCG path.

Optionally, in a case that the MCG path meets the MCG path failure condition, the SCG path does not meet the SCG path failure condition, and the indirect path does not meet the indirect path failure condition, the processor 710 determines, based on one of the following, a manner of recovering the MCG path: random selection, network configuration, or stipulation in a protocol.

Optionally, a step of determining, by the processor 710 based on the network configuration, a manner of recovering the MCG path includes: determining, by the processor 710 based on third information configured by the network, whether to recover the MCG path through the SCG path or recover the MCG path through the indirect path, where the third information includes at least one of the following: second indication information, where the second indication information is used to indicate, to the remote UE, whether to recover the MCG path through the SCG path or recover the MCG path through the indirect path; a first threshold, where the first threshold is a Uu link quality threshold for the SCG path; and a second threshold, where the second threshold is a PC5 link quality threshold for the indirect path.

Optionally, a step of determining, by the processor 710 based on Uu link quality of the SCG path and/or PC5 link quality of the indirect path, whether to recover the MCG path through the SCG path or recover the MCG path through the indirect path includes: in a case that the Uu link quality of the SCG path meets the first threshold, performing, by the processor 710, the operation of recovering the MCG path through the SCG path; in a case that the Uu link quality of the SCG path does not meet the first threshold, performing, by the processor 710, the operation of recovering the MCG path through the indirect path; in a case that the PC5 link quality of the indirect path meets the second threshold, performing, by the processor 710, the operation of recovering the MCG path through the indirect path; in a case that the PC5 link quality of the indirect path does not meet the second threshold, performing, by the processor 710, the operation of recovering the MCG path through the SCG path; in a case that the Uu link quality of the SCG path meets the first threshold and the PC5 link quality of the indirect path does not meet the second threshold, performing, by the processor 710, the operation of recovering the MCG path through the SCG path; or in a case that the Uu link quality of the SCG path does not meet the first threshold and the PC5 link quality of the indirect path meets the second threshold, performing, by the processor 710, the operation of recovering the MCG path through the indirect path.

Optionally, in a case that the indirect path meets the indirect path failure condition, the MCG path does not meet the MCG path failure condition, and the SCG path does not meet the SCG path failure condition, the processor 710 determines, based on at least one of the following, a manner of recovering the indirect path: random selection, network configuration, or stipulation in a protocol.

Optionally, a step of determining, by the processor 710 based on the network configuration, a manner of recovering the indirect path includes: determining, by the processor 710 based on four information configured by the network, whether to recover the indirect path through the MCG path or recover the indirect path through the SCG path, where the fourth information includes at least one of the following: third indication information, where the third indication information is used to indicate, to the remote UE, whether to recover the indirect path through the MCG path or recover the indirect path through the SCG path; a third threshold, where the third threshold is a Uu link quality threshold for the SCG path; and a fourth threshold, where the fourth threshold is a Uu link quality threshold for the MCG path.

Optionally, a step of determining, by the remote UE based on Uu link quality of the SCG path and/or Uu link quality of the MCG path, whether to recover the indirect path through the MCG path or recover the indirect path through the SCG path includes: in a case that the Uu link quality of the SCG path meets the third threshold, performing, by the processor 710, the operation of recovering the indirect path through the SCG path; in a case that the Uu link quality of the SCG path does not meet the third threshold, performing, by the processor 710, the operation of recovering the indirect path through the MCG path; in a case that the Uu link quality of the MCG path meets the fourth threshold, performing, by the processor 710, the operation of recovering the indirect path through the MCG path; in a case that the Uu link quality of the MCG path does not meet the fourth threshold, performing, by the remote UE, the operation of recovering the indirect path through the SCG path; in a case that the Uu link quality of the SCG path meets the third threshold and the Uu link quality of the MCG path does not meet the fourth threshold, performing, by the processor 710, the operation of recovering the indirect path through the SCG path; or in a case that the Uu link quality of the SCG path does not meet the third threshold and the Uu link quality of the MCG path meets the fourth threshold, performing, by the processor 710, the operation of recovering the indirect path through the MCG path.

Optionally, the performing, by the processor 710, the operation of recovering the MCG path through the indirect path includes: performing, by the processor 710, the operation of recovering the MCG path through the indirect path in a case that a ninth target base station corresponding to the indirect path supports an RRC process of recovering the MCG path through the indirect path; or performing, by the processor 710, the reestablishment operation in a case that a ninth target base station corresponding to the indirect path does not support an RRC process of recovering the MCG path through the indirect path.

Optionally, the performing, by the processor 710, the operation of recovering the MCG path through the indirect path in a case that a ninth target base station corresponding to the indirect path supports an RRC process of recovering the MCG path through the indirect path includes: reporting, by the processor 710 to the ninth target base station corresponding to the indirect path, an MCG direct connection failure message corresponding to the MCG path, and starting a third timer, where the third timer is used to indicate validity duration of the RRC process of recovering the MCG path through the indirect path; and stopping, by the processor 710, the third timer in the case of receiving a fifth RRC reconfiguration message transmitted by the ninth target base station, where the fifth RRC reconfiguration message includes configuration information of at least one sixth cell, and the configuration information of the sixth cell is used to indicate the remote UE to establish the MCG path to a tenth target base station to which the sixth cell belongs.

Optionally, the performing, by the processor 710, the operation of recovering the indirect path through the MCG path includes: performing, by the processor 710, the operation of recovering the indirect path through the MCG path in a case that an eleventh target base station corresponding to the MCG path supports an RRC process of recovering the indirect path through the MCG path; or performing, by the processor 710, the reestablishment operation in a case that an eleventh target base station corresponding to the MCG path does not support an RRC process of recovering the indirect path through the MCG path.

Optionally, the performing, by the processor 710, the operation of recovering the indirect path through the MCG path in a case that an eleventh target base station corresponding to the MCG path supports an RRC process of recovering the indirect path through the MCG path includes: reporting, by the processor 710 to the eleventh target base station corresponding to the MCG path, an indirect path failure message corresponding to the indirect path, and starting a fourth timer, where the fourth timer is used to indicate validity duration of the RRC process of recovering the indirect path through the MCG path; and stopping, by the processor 710, the fourth timer in the case of receiving a sixth RRC reconfiguration message transmitted by the eleventh target base station, where the sixth RRC reconfiguration message includes at least configuration information of one sixth relay UE, and the configuration information of the sixth relay UE is used to indicate the remote UE to establish the indirect path to a twelfth target base station to which the sixth relay UE belongs.

Optionally, the step of recovering, by the processor 710, the indirect path through the SCG path includes: performing, by the processor 710, the operation of recovering the indirect path through the SCG path in a case that a thirteenth target base station corresponding to the SCG path supports recovery of the indirect path through the SCG path; or performing, by the processor 710, the reestablishment operation in a case that a thirteenth target base station corresponding to the SCG path does not support recovery of the indirect path through the SCG path.

Optionally, the performing, by the processor 710, the operation of recovering the indirect path through the SCG path in a case that a thirteenth target base station corresponding to the SCG path supports recovery of the indirect path through the SCG path includes: reporting, by the processor 710 to the thirteenth target base station corresponding to the SCG path, an indirect path failure message corresponding to the indirect path, and starting a fifth timer, where the fifth timer is used to indicate validity duration of an RRC process of recovering the indirect path through the SCG path; and stopping, by the processor 710, the fifth timer in the case of receiving a sixth RRC reconfiguration message transmitted by the thirteenth target base station corresponding to the SCG path, where the sixth RRC reconfiguration message includes at least configuration information of one eighth relay UE, and the configuration information of the eighth relay UE is used to indicate the remote UE to establish the indirect path to a fourteenth target base station to which the eighth relay UE belongs.

In this embodiment, the terminal performs the first operation or the second operation for at least one of a direct path and an indirect path that are supported. In this way, on the one hand, the direct path and/or the indirect path are established, reestablished, or recovered through the establishment operation, the reestablishment operation, or the first recovery operation, so that the terminal can implement path reestablishment and recovery in multi-path transmission while supporting the multi-path transmission, to ensure RRC robustness; on the other hand, a failed path is quickly recovered through a path without a failure, to avoid a problem in the conventional technology that radio link recovery time is long because an RRC reestablishment process needs to be initiated, effectively shorten radio link recovery time, and improve RRC robustness of the terminal.

An embodiment of this application further provides a readable storage medium. The readable storage medium stores a program or instructions. When the program or instructions are executed by a processor, the processes of the embodiments of the communication path configuration method are implemented, with the same technical effect achieved. To avoid repetition, details are not described herein again.

The processor is a processor in the terminal in the foregoing embodiments. The readable storage medium includes a computer-readable storage medium, for example, a computer read-only memory (ROM).

An embodiment of this application further provides a chip. The chip includes a processor and a communications interface. The communications interface is coupled to the processor. The processor is configured to run a program or instructions for a network-side device, to implement the processes of the embodiments of the communication path configuration method, with the same technical effect achieved. To avoid repetition, details are not described herein again.

It should be understood that the chip provided in this embodiment of this application may also be referred to as a system-level chip, a system on chip, a chip system, a system-on-a-chip, or the like.

An embodiment of this application further provides a computer program product. The computer program product is stored in a non-transitory storage medium. When the computer program product is executed by a processor, the processes of the embodiments of the communication path configuration method are implemented, with the same technical effect achieved. To avoid repetition, details are not described herein again.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the methods and apparatuses in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, a person skilled in the art can clearly understand that the methods in the foregoing embodiments may be implemented by using software in combination with a necessary common hardware platform, or certainly may be implemented by using hardware. However, in most cases, the former is a preferred implementation. Based on such an understanding, the technical solutions of this application essentially or the part contributing to the conventional technology may be implemented in a form of a computer software product. The computer software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the methods in embodiments of this application.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. A communication path configuration method, comprising:

performing, by remote UE, a second operation for at least one of a direct path or an indirect path; and communicating, by the remote UE, with a network side through the direct path and the indirect path, wherein the second operation comprises a second recovery operation, and the second recovery operation comprises an operation of recovering, by the remote UE, the indirect path through the direct path, or an operation of recovering, by the remote UE, the direct path through the indirect path, wherein the operation of recovering, by the remote UE, the direct path through the indirect path comprises: performing, by the remote UE, an operation of recovering the direct path through the indirect path in a case that a fifth target base station corresponding to the indirect path supports an RRC process of recovering the direct path through the indirect path;

wherein the performing, by the remote UE, the operation of recovering the direct path through the indirect path in a case that a fifth target base station corresponding to the indirect path supports an RRC process of recovering the direct path through the indirect path comprises:

reporting, by the remote UE to the fifth target base station corresponding to the indirect path, a direct path failure message corresponding to the direct path, and starting a first timer, wherein the first timer is used to indicate validity duration of the RRC process of recovering the direct path through the indirect path; and stopping, by the remote UE, the first timer in the case of receiving a third RRC reconfiguration message transmitted by the fifth target base station, wherein the third RRC reconfiguration message comprises at least configuration information of one fifth cell, and the configuration information of the fifth cell is used to indicate the remote UE to establish the direct path to a sixth target base station to which the fifth cell belongs; or the operation of recovering, by the remote UE, the indirect path through the direct path comprises: performing, by the remote UE, an operation of recovering the indirect path through the direct path in a case that a seventh target base station corresponding to the direct path supports an RRC process of recovering the indirect path through the direct path, wherein the performing, by the remote UE, the operation of recovering the indirect path through the direct path in a case that a seventh target base station corresponding to the direct path supports an RRC process of recovering the indirect path through the direct path comprises:

reporting, by the remote UE to the seventh target base station corresponding to the direct path, an indirect path failure message corresponding to the indirect path, and starting a second timer, wherein the second timer is used to indicate validity duration of the RRC process of recovering the indirect path through the direct path; and stopping, by the remote UE, the second timer in the case of receiving a fourth RRC reconfiguration message transmitted by the seventh target base station, wherein the fourth RRC reconfiguration message comprises at least configuration information of one fifth relay UE, and the configuration information of the fifth relay UE is used to indicate the remote UE to establish the indirect path to an eighth target base station to which the fifth relay UE belongs.

2. The method according to claim 1, wherein the step of performing, by remote UE, a second operation for at least one of a direct path or an indirect path comprises:

determining, by the remote UE, first information; and performing, by the remote UE, the second operation for at least one of the direct path or the indirect path based on the first information, wherein the first information comprises at least one of the following:

whether the direct path meets a direct path failure condition; or whether the indirect path meets an indirect path failure condition.

3. The method according to claim 2, wherein the direct path failure condition comprises at least one of the following:

a Uu radio link failure occurs on the remote UE; or a Uu radio link recovery failure occurs on the remote UE.

4. The method according to claim 2, wherein the indirect path failure condition comprises at least one of the following:

a PC5 radio link failure occurs between the remote UE and relay UE;

a PC5 radio link release occurs between the remote UE and the relay UE; or the remote UE receives first indication information from the relay UE, wherein the first indication information is transmitted by the relay UE in a case that a first condition is met, and the first condition comprises at least one of the following: a Uu radio link failure occurs on the relay UE, a Uu radio link recovery failure occurs on the relay UE, a Uu handover occurs on the relay UE, or a Uu handover failure occurs on the relay UE.

5. The method according to claim 2, wherein the step of performing, by the remote UE, the second operation for at least one of the direct path or the indirect path based on the first information comprises any one of the following:

in a case that the direct path meets the direct path failure condition and the indirect path does not meet the indirect path failure condition, performing, by the remote UE, the operation of recovering the direct path through the indirect path;

in a case that the direct path does not meet the direct path failure condition and the indirect path meets the indirect path failure condition, performing, by the remote UE, the operation of recovering the indirect path through the direct path; or in a case that the direct path meets the direct path failure condition and the indirect path meets the indirect path failure condition, performing, by the remote UE, a reestablishment operation.

6. The method according to claim 1, wherein the performing, by the remote UE, the operation of recovering the direct path through the indirect path in a case that a fifth target base station corresponding to the indirect path supports an RRC process of recovering the direct path through the indirect path further comprises:

in a case that the first timer expires, performing, by the remote UE, a reestablishment operation.

7. The method according to claim 1, wherein in a case that the fifth target base station corresponding to the indirect path is different from the sixth target base station to which the fifth cell belongs, the configuration information of the fifth cell that is comprised in the third RRC reconfiguration message is generated by the sixth target base station and then transmitted to the fifth target base station.

8. The method according to claim 1, wherein the step of recovering, by the remote UE, the direct path through the indirect path comprises:

performing, by the remote UE, a reestablishment operation in a case that the fifth target base station corresponding to the indirect path does not support the RRC process of recovering the direct path through the indirect path.

9. The method according to claim 1, wherein the performing, by the remote UE, the operation of recovering the indirect path through the direct path comprises:

performing, by the remote UE, a reestablishment operation in a case that the seventh target base station corresponding to the direct path does not support the RRC process of recovering the indirect path through the direct path.

10. The method according to claim 1, wherein the performing, by the remote UE, the operation of recovering the indirect path through the direct path in a case that a seventh target base station corresponding to the direct path supports an RRC process of recovering the indirect path through the direct path further comprises:

in a case that the second timer expires, performing, by the remote UE, a reestablishment operation.

11. The method according to claim 1, wherein in a case that the seventh target base station corresponding to the direct path is different from the eighth target base station to which the fifth relay UE belongs, the fourth RRC reconfiguration message is generated by the eighth target base station and then transmitted to the seventh target base station.

* * * * *